US012625445B2

(12) United States Patent

Nagashima et al.

(10) Patent No.: US 12,625,445 B2

(45) Date of Patent: May 12, 2026

(54) POWER CONTROL DEVICE, FIXING DEVICE, AND IMAGE FORMING APPARATUS

(71) Applicant: CANON KABUSHIKI KAISHA, Tokyo (JP)

(72) Inventors: Satoru Nagashima, Tokyo (JP); Kouji Yasukawa, Tokyo (JP); Yusuke Nakashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/933,319

(22) Filed: Oct. 31, 2024

(65) Prior Publication Data

US 2025/0053126 A1 Feb. 13, 2025

Related U.S. Application Data

(62) Division of application No. 18/163,831, filed on Feb. 2, 2023, now Pat. No. 12,169,379.

(30) Foreign Application Priority Data

Feb. 28, 2022 (JP) ................................ 2022-029268

(51) Int. Cl.

*G03G 15/20* (2006.01)
*G03G 15/00* (2006.01)
*H05B 3/00* (2006.01)

(52) U.S. Cl.

CPC ....... *G03G 15/5004* (2013.01); *G03G 15/205* (2013.01); *H05B 3/0066* (2013.01); *G03G 2215/2038* (2013.01)

(58) Field of Classification Search

CPC ............. G03G 15/2039; G03G 15/205; G03G 15/5004; H05B 1/0241; H05B 3/0066; H05B 39/09; H05B 39/02
USPC ..... 399/69, 88; 219/216, 250, 251, 494, 510
See application file for complete search history.

(56) References Cited

U.S. PATENT DOCUMENTS

| | | | | |
|---|---|---|---|---|
| 4,493,984 | A | 1/1985 | Yamauchi | G03G 15/20 |
| 2002/0043387 | A1 | 4/2002 | Uang | H01B 11/06 |
| 2004/0146311 | A1 | 7/2004 | Kawazu et al. | G03G 15/0039 |
| 2013/0108306 | A1 | 5/2013 | Saito et al. | G03G 15/20 |
| 2013/0336672 | A1 | 12/2013 | Mizuta et al. | G03G 21/18 |
| 2015/0093134 | A1 | 4/2015 | Itoh | G03G 15/0039 |

(Continued)

FOREIGN PATENT DOCUMENTS

| | | |
|---|---|---|
| EP | 1339053 | 8/2003 |
| JP | 2001-326087 | 11/2001 |

(Continued)

*Primary Examiner* — Robert B Beatty

(74) *Attorney, Agent, or Firm* — Venable LLP

(57) ABSTRACT

A power control device includes a heater, a zero-cross detecting unit, a triac, a supplying unit, and a controlling unit. The supplying unit discharges an electric charge when a control signal is outputted in a half-wave of each of a first polarity and a second polarity and charges the electric charge when the control signal is not outputted in the half-wave of the first polarity. The controlling unit outputs: in a first half-wave, a first control signal on the basis of the zero-cross point and a second control signal in a first phase different in timing from the first control signal, and in a second half-wave, a third control signal on the basis of the zero-cross point and a fourth control signal in a second phase different in timing from the second control signal. The first phase and the second phase are different from each other.

11 Claims, 14 Drawing Sheets

(56) References Cited

U.S. PATENT DOCUMENTS

| | | | | |
|---|---|---|---|---|
| 2015/0139672 | A1 | 5/2015 | Nakashima et al. | G03G 15/20 |
| 2015/0139681 | A1 | 5/2015 | Mizuta et al. | G03G 15/00 |
| 2015/0338804 | A1 | 11/2015 | Nakashima et al. | G03G 15/20 |
| 2018/0113404 | A1 | 4/2018 | Yasukawa et al. | G03G 15/20 |
| 2020/0201214 | A1 | 6/2020 | Ogura et al. | G03G 15/20 |
| 2020/0233350 | A1 | 7/2020 | Oi et al. | G03G 15/20 |
| 2020/0292981 | A1 | 9/2020 | Nagashima | G03G 15/00 |
| 2020/0301329 | A1 | 9/2020 | Nakashima et al. | G03G 15/20 |
| 2021/0263461 | A1 | 8/2021 | Kinukawa et al. | G03G 15/00 |
| 2021/0364953 | A1 | 11/2021 | Nagashima | G03G 15/205 |
| 2021/0405558 | A1 | 12/2021 | Yasukawa et al. | G03G 15/20 |
| 2023/0244162 | A1 | 8/2023 | Tagami et al. | G03G 15/2017 |

FOREIGN PATENT DOCUMENTS

| | | |
|---|---|---|
| JP | 2002-247758 | 8/2002 |
| JP | 2008-076549 | 4/2008 |
| JP | 2021-179883 | 11/2021 |
| JP | 2021-184019 | 12/2021 |

POWER CONTROL DEVICE, FIXING DEVICE, AND IMAGE FORMING APPARATUS

CROSS-REFERENCE TO RELATED APPLICATIONS

This application is a divisional of application Ser. No. 18/163,831 filed Feb. 2, 2023, currently pending; and claims priority under 35 U.S.C. § 119 to Japan Application JP2022-029268 filed in Japan on Feb. 28, 2022; and the contents of all of which are incorporated herein by reference as if set forth in full.

FIELD OF THE INVENTION AND RELATED ART

The present invention relates to a power control device, a fixing device and an image forming apparatus and, for example, relates to a control method of a circuit for controlling electric power supplied to an image heat fixing device mounted in the image forming apparatus such as a copying machine or a laser beam printer.

There is a circuit in which electric power is supplied from an AC power source to a load by controlling electric power supply to a bidirectional thyristor (hereinafter, referred to as a triac) (hereinafter, such control is referred to as electric power control). In such a circuit, as a technique in which a power source different from the AC power source is provided and the electric power control is carried out by passing a gate current from the different power source to the triac, for example, a proposal such as Japanese Laid-Open Patent Application (JP-A) 2002-247758 has been made.

On the other hand, it has been known in general that due to distortion of an AC voltage of the AC power source and superposed noise, the triac turns off. As a method in which the triac is prevented from turning off due to the noise and the electric power control is carried out, for example, a proposal such as JP-A 2001-326087 has been made. In JP-A 2001-326087, a proposal has been made as to a technique such that electric charges are continuously supplied to a power source for supplying the gate current to the triac in order to substantially continuously turn on the triac.

However, in the circuit in which the triac is subjected to the electric power control by passing the gate current from the power source disposed separately from the conventional power source, the following problem arises. In order to substantially continuously turn on the triac, there is a need to continuously supply the gate current to the triac. There is a constraint on capacity of the power source provided separately from the AC power source, so that there is limitation on a time in which the gate current is capable of being supplied to the triac. Or, in order to continuously supply the gate current to the triac, there is a need to provide a power source having a large electric charge capacity. Therefore, in order to continuously supply the gate current to the triac, there is a need to continuously charging the electric charges to the power source provided separately from the AC power source by using a circuit element such as a transformer or a bridge diode. For this reason, in the circuit in which the gate current is supplied to the triac from the power source provided separately from the AC power source, it has been required that the triac is continuously controlled while avoiding the influence by the distortion of the AC power source and the noise as can as possible by a simple means while suppressing an increase in cost.

SUMMARY OF THE INVENTION

According to an aspect of the present invention, there is provided a power control device comprising: a heater configured to generate heat by being supplied with an AC voltage; a zero-cross detecting unit configured to detect a zero-cross point of the AC voltage; a triac configured to switch a conduction state in which the AC voltage is supplied to the heater and a non-conduction in which supply of the AC voltage to the heater is cut off; a supplying unit configured to supply a current to the triac; and a controlling unit configured to control a state of the triac by outputting a control signal, wherein the controlling unit controls the state of the triac by outputting the control signal in a control period in which a plurality of half-waves of the AC voltage with a first polarity and a plurality of half-waves of the AC voltage with a second polarity different from the first polarity constitute one period of control, wherein the supplying unit discharges an electric charge when the control signal is outputted in the half-wave of each of the first polarity and the second polarity and charges the electric charge when the control signal is not outputted in the half-wave of the first polarity, wherein the controlling unit outputs: in a first half-wave, a first control signal on the basis of the zero-cross point as a reference and a second control signal in a first phase different in timing from the first control signal, and in a second half-wave, a third control signal on the basis of the zero-cross point as a reference and a fourth control signal in a second phase different in timing from the second control signal, and wherein the first phase and the second phase are different from each other.

Further features of the present invention will become apparent from the following description of exemplary embodiments with reference to the attached drawings.

DESCRIPTION OF THE EMBODIMENTS

In the following, embodiments for carrying out the present invention will be described specifically with reference to the drawings.

Embodiment 1

Image Forming Apparatus

Figure 1:
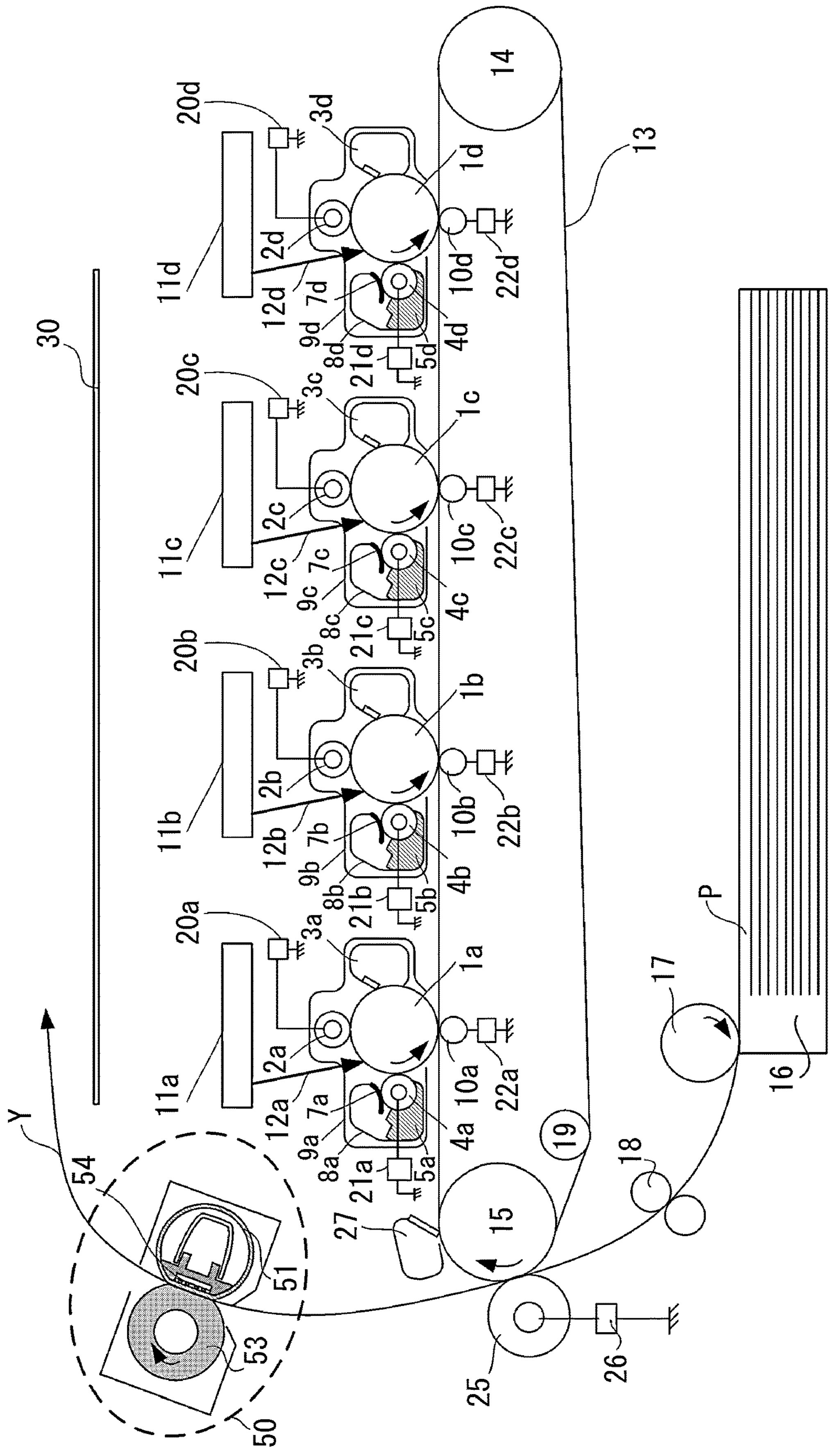
FIG. 1 is a schematic view showing a general structure of an image forming apparatus according to embodiments 1-5.

FIG. 1 is a schematic sectional view showing a structure of an in-line color image forming apparatus which is an example of an image forming apparatus in which a fixing device according to an embodiment 1 is mounted. The structure of the color image forming apparatus of an electrophotographic type will be described using FIG. 1. Incidentally, a first station is a station for forming a toner image of yellow (Y), and a second station is a station for forming a toner image of magenta (M). Further, a third station is a station for forming a toner image of cyan (C), and a fourth station is a station for forming a toner image of black (K).

In the first station, a photosensitive drum 1*a* which is an image bearing member is an OPC photosensitive drum. The photosensitive drum 1*a* comprises a plurality of lamination layers of functional organic materials, including a carrier generating layer for generating electric charges on a metal cylinder through light exposure and a charge transporting layer for transporting the generated electric charges, and the like layer, and an outermost layer is low in electrical conductivity and is substantially insulative. A charging roller 2*a* which is a charging unit contacts the photosensitive drum 1*a* and electrically charges a surface of the photosensitive drum 1*a* uniformly while being rotated by the photosensitive drum 1*a* with rotation of the photosensitive drum 1*a*. To the charging roller 2*a*, a voltage superpose with a DC voltage or an AC voltage is applied, so that electric discharge generates from a nip between the surfaces of the charging roller 2*a* and the photosensitive drum 1*a* in minute air gaps on sides upstream and downstream of the nip with respect to a rotational direction of the photosensitive drum 1*a*. By this, the photosensitive drum 1*a* is charged. A cleaning unit 3*a* is a unit for removing toner remaining on the photosensitive drum 1*a* after primary transfer, as described later. A developing unit 8*a* which is a developing unit stores non-magnetic one-component toner 5*a*, and includes a developing roller 4*a* and a developer application blade 7*a*. The photosensitive drum 1*a*, the charging roller 2*a*, the cleaning unit 3*a*, and the developing unit 8*a* are accommodated in an integral process cartridge 9*a* (image forming portion) mountable in and dismountable from the image forming apparatus.

An exposure device 11*a* which is an exposure unit is constituted by a scanner unit or a light emitting diode (LED) array for scanning the photosensitive drum 1*a* with laser light reflected by a rotary polygonal mirror, and the surface of the photosensitive drum 1*a* is irradiated with a scanning beam 12*a* modulated on the basis of an image signal. Further, the charging roller 2*a* is connected to a charging high-voltage source 20*a* which is a voltage supplying unit to the charging roller 2*a*. The developing roller 4*a* is connected to a developing high-voltage source 21*a* which is a voltage supplying unit to the developing roller 4*a*. A primary transfer roller 10*a* is connected to a primary transfer high-voltage source 22*a* which is a voltage supplying unit to the primary transfer roller 10*a*. The above is a constitution of the first station, and the second to fourth stations have similar constitutions. As regards the second to fourth (other) stations, component elements having the same functions as those in the first station are represented by the same reference numerals, and associated suffixes b, c and d are added to the reference numerals for the respective stations. Incidentally, in the following description, the suffixes a, b, c and d will be omitted except for the case where specific station is described.

An intermediary transfer belt 13 is supported by three rollers, as stretching members therefor, consisting of a secondary transfer opposite roller 15, a tension roller 14, and an auxiliary roller 19. To only the tension roller 14, a force in a direction in which the intermediary transfer belt 13 is stretched is applied by a spring (not shown), so that proper tension applied to the intermediary transfer belt 13 is maintained. The secondary transfer opposite roller 15 is rotated by receiving rotational drive from a main motor 99 (see FIG. 2), so that the intermediary transfer belt 13 surrounding the secondary transfer opposite roller 15 is rotated. The intermediary transfer belt 13 is moved in an arrow direction (for example, the clockwise direction in FIG. 1) for the photosensitive drums 1*a* to 1*d* (for example, rotate in the counterclockwise direction in FIG. 1) substantially at the same speed. Further, the primary transfer roller 10 is disposed opposed to the photosensitive drum 1 while sandwiching the intermediary transfer belt 13 therebetween. A position where the photosensitive drum 1 contacts the intermediary transfer belt 13 toward the primary transfer roller 10 is a primary transfer position. The auxiliary roller 19, the tension roller 14 and the secondary transfer opposite roller 15 are electrically grounded. Incidentally, primary transfer rollers 10*b* to 10*d* of the second to fourth stations also have constitutions similar to the constitution of the primary transfer roller 10*a* of the first station, and therefore, will be omitted from description.

Next, an image forming operation of the image forming apparatus shown in FIG. 1 will be described. When the image forming apparatus receives a print instruction in a stand-by state, the image forming apparatus starts the image forming operation. The photosensitive drum 1 and the intermediary transfer belt 13, and the like start rotations in the arrow directions in FIG. 1 at a predetermined process speed by the main motor 99 (see FIG. 2). The photosensitive drum 1*a* is electrically charged uniformly by the charging roller 2*a* to which a charging voltage is applied from the charging high-voltage source 20*a*, and then is exposed to the scanning beam 12*a* emitted from the exposure device 11*a*, so that an electrostatic latent image depending on image information is formed on the photosensitive drum 1*a*. Toner 5*a* in the developing unit 8*a* is negatively charged by the developer applying blade 7*a* and is applied onto the developing roller 4*a*. Then, to the developing roller 4*a*, a predetermined developing voltage is supplied from the developing high-voltage source 21*a*. The photosensitive drum 1*a* is rotated, and when the electrostatic latent image formed on the photosensitive drum 1*a* reaches the developing roller 4*a*, the electrostatic latent image is visualized by deposition of the negatively charged toner on the photosensitive drum 1*a*, so that a toner image of a first color (for example, Y (yellow)) is formed in the photosensitive drum 1*a*. The stations (process cartridges 9*b* to 9*d*) for other colors of M (magenta), C (cyan) and K (black) similarly operate. At timings depending on distances between the respective primary transfer positions for the colors, the electrostatic latent images are formed on the photosensitive drums 1*a* to 1*d* by the scanning beams 12*a* to 12*d* from the exposure devices 11*a* to 11*d* while delaying writing signals from a controller (not shown). To each of the primary transfer rollers 10*a* to 10*d*, DC high-voltages of a polarity opposite to a charge polarity of the toner are applied from the primary transfer high-voltage source 22*a* to 22*d*. By this, the toner images on the photosensitive drums 1*a* to 1*d* are successively transferred onto the intermediary transfer belt 13 (hereinafter, this transfer is referred to as primary transfer), so that a multiple-toner images are formed on the intermediary transfer belt 13.

Thereafter, in synchronism with the toner image formation, a sheet P which is a recording material stacked on a cassette 16 (sheet feeding portion) is fed to a feeding passage Y by a sheet feeding roller 17 rotationally driven by a sheet feeding solenoid (not shown). The fed sheet P is fed to a registration roller pair 18 by feeding (conveying) rollers. The sheet P is fed to a transfer nip, which is a contact portion between the intermediary transfer belt 13 and a secondary transfer roller 25, by the registration roller pair 18 in synchronism with the toner images on the intermediary transfer belt 13. To the secondary transfer roller 25, a voltage of a polarity opposite to the charge polarity of the toner is applied by a secondary transfer high-voltage source 26, so that the multiple toner images of the four colors carried on the intermediary transfer belt 13 are collectively transferred onto the sheet (recording material) P (hereinafter, this transfer is formed to as secondary transfer). Members contributing to the image forming operation until the unfixed toner images are formed on the sheet P (for example, the photosensitive drum 1 and the like) function as an image forming unit. On the other hand, after the secondary transfer is ended, the toner remaining on the intermediary transfer belt 13 is removed by a cleaning unit 27. A fixing device 50 which is a fixing means is a device for fixing the toner image, after the secondary transfer thereof is ended, on the sheet P, and is constituted by a film 51, a heater 54, a fixing temperature sensor 59 (see FIG. 2) for detecting a temperature of the heater 54, and a pressing roller 53 which is a roller as a rotatable pressing member. The pressing roller 53 is rotatably held at opposite ends and is rotationally driven by a fixing motor 89 (see FIG. 2). The pressing roller 53 forms a nip in cooperation with the film 51. Further, by rotation of the pressing roller 53, the film 51 is rotated. The heater 54 as a heating member is temperature-controlled to a desired temperature by a CPU 94 (see FIG. 2) on the basis of a detection result of the fixing temperature sensor 59 for detecting the temperature of the heater 54. By the heater 54 controlled to the desired temperature, heat is conducted to the film 51. Thus, the sheet P after the secondary transfer is ended is fed to the fixing device 50 which is a fixing unit, in which the toner image is fixed on the sheet P by heat of the film 51 and pressure of the pressing roller 53, and then the sheet P is discharged as an image-formed product (print, copy) onto a discharge tray 30.

An operation in a mode in which images are continuously printed on a plurality of sheets P is hereinafter referred to as continuous printing or a continuous job. In the continuous printing, an interval between a trailing end of a sheet P on which the printing is made early (hereinafter, referred to as a current sheet) and a leading end of a sheet P on which the printing is made subsequently to the current sheet (hereinafter, this sheet is referred to as a subsequent sheet) is referred to as a sheet interval. In this embodiment, in the continuous printing of images on A4-size sheets, the printing is made by feeding the triac images on the intermediary transfer belt 13 and the sheets P so that a distance of the sheet interval becomes 30 mm, for example. The image forming apparatus in this embodiment is a center-basis image forming apparatus in which a printing operation is performed by causing center periods of the respective members and the sheets P with respect to a direction (longitudinal direction described later) perpendicular to the (sheet) feeding direction to coincide with each other. Accordingly, even in the printing operation for sheets P large in length with respect to the direction perpendicular to the feeding direction and in the printing operation for the sheets P small in length with respect to the direction perpendicular to the feeding direction, center periods of the respective sheets P coincide with each other.

Control Block Diagram of Image Forming Apparatus

Figure 2:
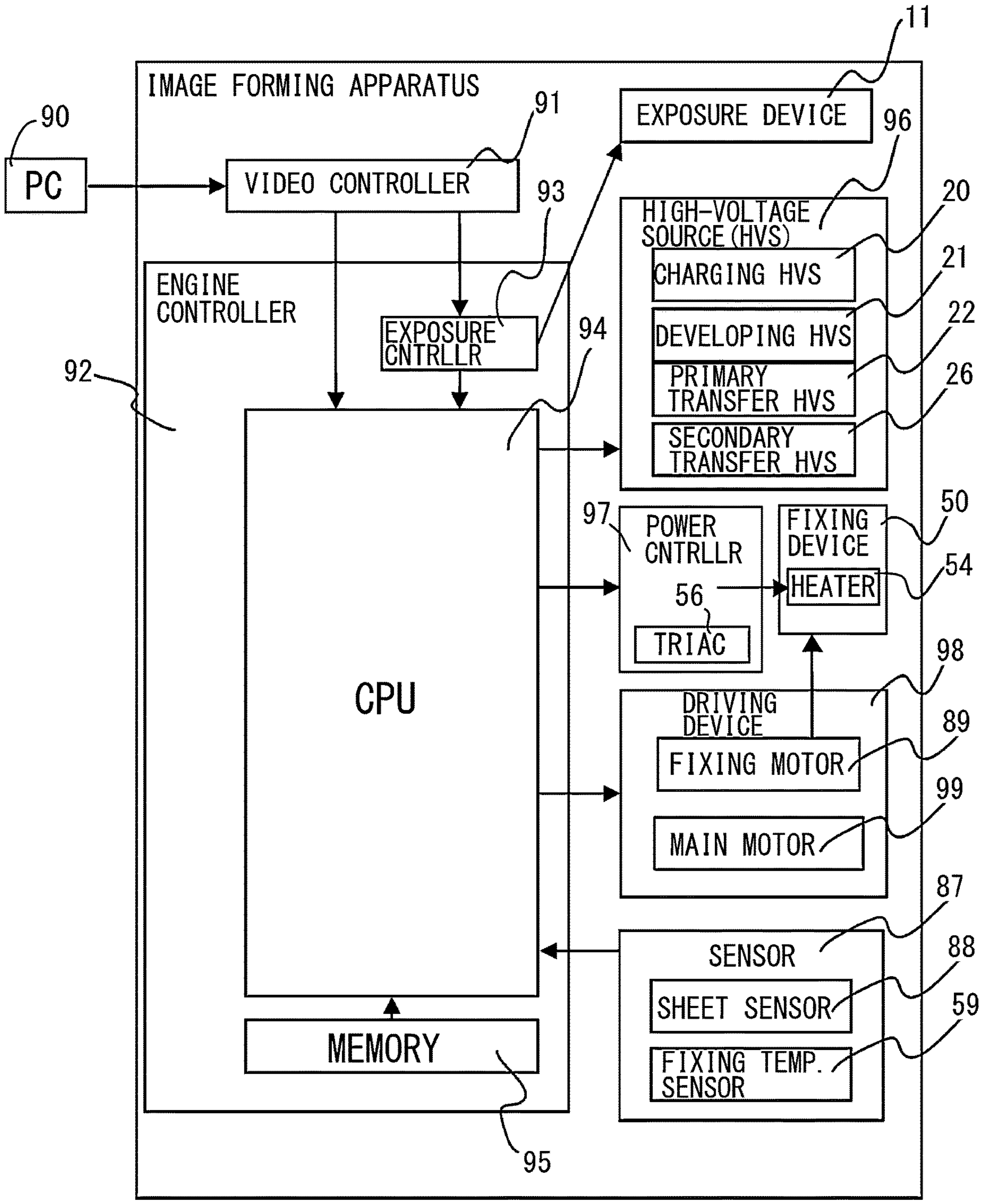
FIG. 2 is a control block diagram of the image forming apparatus of the embodiments 1-5.

FIG. 2 is a block diagram showing a constitution of a controller of the image forming apparatus, and the printing operation of the image forming apparatus will be described while making reference to FIG. 2. A PC 90 which is a host computer performs sends a printing instruction to a video controller 91 provided inside the image forming apparatus, including image data of a print image.

The video controller 91 converts the image data, received from the PC 90, into the exposure data, and not only transfers the exposure data to an exposure control device 93 provided in an engine controller 92, but also sends the printing instruction to the CPU 94 in the engine controller 92. The exposure control device 93 is controlled by the CPU 94, and controls the exposure device 11 for turning on and off the laser light depending on the exposure data. The CPU 94 which is a control unit starts an image forming operation when receives the printing instruction from the video controller 91.

In the engine controller 92, the CPU 94, a memory 95 and the like are mounted. The CPU 94 operates in accordance with a program stored in the memory 95 in advance. Further, the CPU 94 includes a timer for measuring a time, and in the memory 95, various pieces of information for controlling the fixing device 50 are stored. A high-voltage source 96 is constituted by the charging high-voltage source 20, the developing high-voltage source 21, the primary transfer high-voltage source 22, and the secondary transfer high-voltage source 26 which are described above. Further, an electric power controller 97 includes a bidirectional thyristor which is a switching element (hereinafter, this element is referred to as a triac) 56. The electric power controller 97 controls an amount of electric power supplied to the heater 54 in the fixing device 50.

A driving device 98 is constituted by the main motor 99, the fixing motor 89 and the like. A driving force is transmitted to the pressing roller 53 of the fixing device 50 by the fixing motor 89, so that the pressing roller 53 is rotationally driven. A sensor 87 is constituted by the fixing temperature sensor 59 which is a temperature detecting sensor for detecting the temperature of the fixing device 50, a sheet (paper) sensor 88, provided with a flag, for detecting presence or absence of the sheet P, and the like sensor, and a detection result of the sensor 87 is sent to the CPU 94. The CPU 94 acquires the detection result of the sensor 87 in the image forming apparatus, and controls the exposure device 11, the high-voltage source 96, the electric power controller 97, and the driving device 98 on the basis of the detection result. By this, the CPU 94 carries out formation of the electrostatic latent image, transfer of the toner image, onto the sheet P, into which the electrostatic latent image is developed, fixing of the transferred toner image on the sheet P, and the like, and thus carries out control of an image forming step in which the image data received from the PC 90 is printed as the toner image on the sheet P. Incidentally, the image forming apparatus to which the present invention is applied is not limited to the image forming apparatus described with reference to FIG. 1, but in which the images can be printed on the sheets P with different widths, and may only be required to include the fixing device 50 provided with the heater 54.

Constitution and Operation of Zero-Cross Circuit and Power Control Circuit

Figure 3:
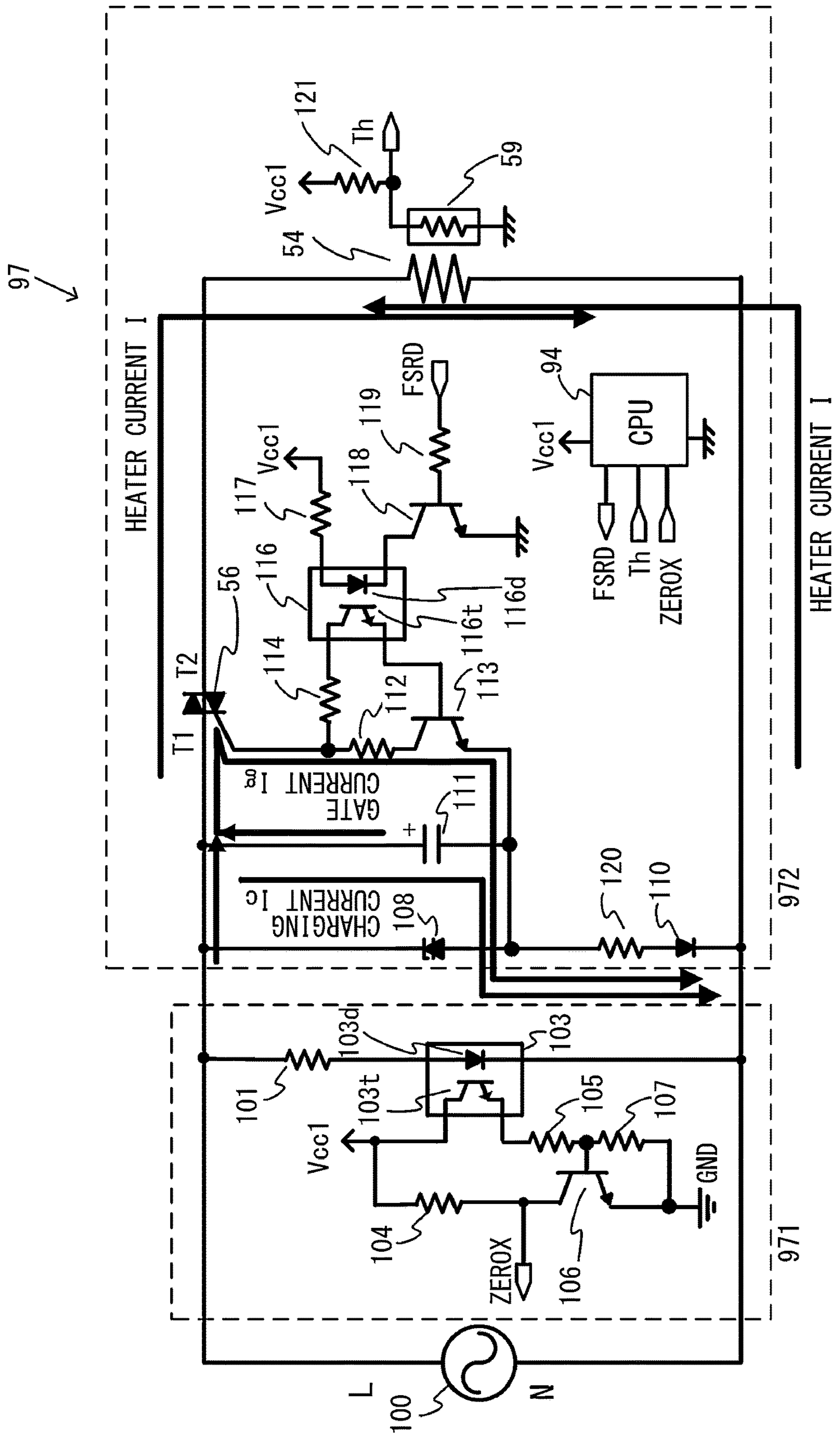
FIG. 3 is a schematic view showing entirety of a circuit constitution of a fixing device of the embodiments 1 to 5.

FIG. 3 is a schematic view showing entirety of the electric power controller 97 in the embodiment 1. The electric power controller 97 which is an electric power controller is constituted by a zero-cross circuit portion 971 and a drive circuit portion 972. The zero-cross circuit portion 971 is connected to an AC power source (voltage source) 100. The zero-cross circuit portion 971 includes a photocoupler 103, resistors 101, 104, 105 and 107, a transistor 106, Zener diode 108, and the fixing temperature sensor 59. A DC voltage Vcc 1 is a voltage generated by a DC voltage source (not shown). The DC voltage Vcc 1 is supplied to the CPU 94. The drive circuit portion 972 includes the heater 54, the triac 56, an electrolytic capacitor 111, resistors 112, 114, 117, 119, 120 and 121, transistors 113 and 118, a photocoupler 116, Zener diode 108, and a diode 110. The (electrolytic) capacitor 111 is power source for supplying a gate current Ig to the triac 56. The capacitor 111 functions as a supplying unit for supplying a current to a control terminal of the triac 56 which is a switching element. When the current is supplied to the control terminal of the triac 56, electric charges are discharged from the capacitor 111, and when the supply of the current to the triac 56 is cut off (interrupted), the electric charges are charged to the capacitor 111.

The triac 56 is the switching element which includes a gate as the control terminal and which is put in a conduction state in which an AC voltage is supplied to the heater 54 or in a non-conduction state in which the supply of the AC voltage to the heater 54 is cut off. The triac 56 is connected to between the AC power source 100 and the heater 54. The heater 54 is supplied with the AC voltage and generates heat. A positive pole of the capacitor 111 is connected to a T1 terminal of the triac 56, so that the triac 56 is supplied with a gate current from the capacitor 111.

(Zero-Cross Circuit Portion)

The electric charge circuit portion 971 which is a zero-cross detecting unit of FIG. 3 will be described. The electric charge circuit portion 971 detects zero-cross point of the AC voltage. In the embodiment 1, the electric charge circuit portion 971 detects a half-wave of the AC voltage with one polarity. The photocoupler 103 is changed to one pole of the AC power source 100 via the resistor 101. Specifically, the resistor 101 is connected to an L side of the AC power source 100 at one end thereof.

The resistor 101 is connected to an anode terminal of a photodiode 103*d* of the photocoupler 103 at the other end thereof.

The electric power is supplied from the L-pole side of the AC voltage source 100, and when the voltage becomes a voltage of a certain value or more, a current flows through the photodiode 103*d* of the photocoupler 103 via the resistor 101, so that the photodiode 103*d* emits light. When the photodiode 103*d* of the photocoupler 103 emits light, a current flows in the following manner. That is, the current flows from the DC voltage Vcc1 connected via the resistor through between a collector and an emitter of a phototransistor 103*t* of the photocoupler 103, the resistor 105, the resistor 107 and thus flows toward the ground (hereinafter referred to as GND). Further, at this time, a current flowing through the phototransistor 103*t* of the photocoupler 103 flows toward a base terminal of the transistor 106 via the resistor 105. When the current flows through the base terminal of the transistor 106, the current flows from the DC voltage source Vcc1 toward the resistor 104 and between a collector and an emitter of the transistor 106. Then, a potential between the resistor 104 and a collector terminal of the transistor 106 is inputted as a (zero-cross) signal (hereinafter, referred to as ZEROX signal) to the CPU 94. At this time, the ZEROX signal changes from a high level (Vcc1 potential) to a low level.

When a potential of the L-pole of the AC power source 100 lowers to a certain value or less, the photodiode 103*d* of the photocoupler 103 turns off, so that the base current of the transistor 106 does not flow. For this reason, the ZEROX signal changes from the low level to the high level (Vcc1 potential). On the other hand, in the case where the electric power is supplied from an N-pole side) of the AC power source 100, the photodiode 103*d* of the photocoupler 103 does not emit light and therefore, the base current of the transistor 106 still does not flow, so that the ZEROX signal does not change while being kept in a high-level state. Thereafter, similarly, the zero-cross circuit portion 971 sends the ZEROX signal to the CPU 94 in synchronism with the operation of the AC power source 100.

(Drive Circuit Portion)

Next, the drive circuit portion 972 will be described. The drive circuit portion 972 which is a drive unit is connected to the gate of the triac 56, and puts the triac 56 in the conduction state by supplying the current to the gate or in the non-conduction state by cutting off the supply of the current to the gate. The CPU 94 as a control unit controls the drive circuit portion 972 by outputting a control signal for driving the drive circuit portion 972. The CPU 94 outputs a driving signal to the drive circuit portion 972 in a control (cyclic) period such that a plurality of half-waves of the AC voltage constitutes one (cyclic) period of control. In the following, the driving signal is referred to as an FSRD signal. On the basis of the zero-cross signal inputted from the zero-cross circuit portion 971, the CPU 94 determines a timing when the FSRD signal is outputted, and changes the FSRD signal from a low-level state to a high-level state. The CPU 94 outputs the FSRD signal to a base terminal of the transistor 118. When the FSRD signal changes from a low level to a high level, the current flows to between a base and an emitter of the transistor 118 via the resistor 119. When the current flows between the base and the emitter of the transistor 118 from the DC voltage (source) Vcc1 connected via the resistor 117, the current flows through the photodiode 116*d* of the photocoupler 116 and through between a collector and the emitter of the transistor 118. By this, the photodiode 116*d* of the photocoupler 116 emits light.

When the photodiode 116*d* of the photocoupler 116 emits light, the phototransistor 116*t* is turned on, and in the case where the electric power is supplied from the L-pole side of the AC voltage source 100, the gate current Ig of the triac 56 principally flows along two paths. A first current path is a path via the capacitor 111, the resistor 120, and the diode 110. A current flowing along the first current path is referred to as a charging current Ic. A second current path is a path along which the current flows from the L-pole of the AC power source 100 through between the Tl terminal and the gate terminal of the triac 56, the resistor 112, and the collector and the emitter of the transistor 113 and flows toward, the resistor 120 and the diode 110. A current flowing along the second path is referred to as the gate current Ig. In the case where the electric power is supplied from the N-pole side of the AC power source 100, as regards the gate current Ig of the triac 56, electric charges are supplied only from the capacitor 111, and the current flows along the similar paths.

That is, when the photodiode 116*d* the photocoupler 116 emits light, in the case where the electric power is supplied from the L-pole side of the AC voltage source 100, the current flows from both the L-pole side of the AC voltage source 100 and the capacitor 111 to between the T1 terminal and the gate terminal of the triac 56. On the other hand, in the case where the electric power is supplied from the N-pole side of the AC voltage source 100, the current flows from only the capacitor 111 to between the T1 terminal and the gate terminal of the triac 56. When the current flows to between the T1 terminal and the gate terminal of the triac 56, the state between the T1 terminal and the gate terminal of the triac 56 changes to a conduction B state (hereinafter referred to as an ON state), so that the current flows between the T1 terminal a T2 terminal and thus the electric power is supplied to the heater 54. The current flowing through the heater 54 is referred to as a heater current I.

When the FSRD signal changes from a high level to a low level, the photodiode 116*d* of the photocoupler 116 turns off, so that the gate current Ig of the triac 56 does not flow. For this reason, the state between the T1 terminal and the T2 terminal of the triac 56 becomes a non-conduction state (hereinafter referred to as an OFF state), so that the current does not flow between the T1 terminal and the T2 terminal and thus the electric power is not supplied to the heater 54. The CPU 94 switches between the high level and the low level of the FSRD signal and thus controls turning on/off of the gate current Ig, so that the CPU 94 controls supply of the electric power to the heater 54 through the control of the triac 56. Thus, depending on the FSRD signal outputted from the CPU 94, the triac 56 repeats turning-on and turning-off thereof every half-wave of the AC power source 100 and thus controls the electric power supply to the heater 54.

Charging and Discharging Operation to Capacitor 111

(Charging Operation)

A charging operation to the capacitor 111 will be described. When the electric power is supplied from the L-pole side of the AC power source 100, electric charges are charged in the capacitor 111 by the charging current Ic flowing along a path via the capacitor 111, the resistor 120 and the diode 110. An upper-limit voltage applied to both terminals the capacitor 110 is restricted by Zener voltage of the Zener diode 108. In the case where the electric power is supplied from the N-pole side of the AC power source 100, the direction of the current is restricted depending on the polarity of the diode 110, so that the charging current Ic of capacitor 111 does not flow.

(Discharging Operation)

Next, the discharging operation will be described. Even in the case where the electric power is supplied from either one of the L-pole side and the N-pole side of the AC power source 100, the capacitor 111 discharges the electric charge depending on an operation in which the CPU 94 changes the FSRD signal to the low level or the high level, so that the gate current Ig is caused to flow through between the Tl terminal and the gate terminal of the triac 56. That is, in the case where the triac 56 is turned on when the electric power is supplied from the L-pole side of the AC voltage source 100, the capacitor 111 discharges the electric charge for causing the gate current Ig of the triac 56 to flow while charging the electric charge from the AC voltage source 100. In the case where the triac 56 is turned on when the electric power is supplied from the N-pole side of the AC voltage source 100, in order to cause the gate current Ig of the triac 56 to flow, the capacitor 111 only discharges the electric charge.

Operations of Fixing Temperature Sensor 59 and CPU 94

The operations of the fixing temperature sensor 59 and the CPU 94 will be described. The fixing temperature sensor 59 is, for example, an NTC thermistor and has a characteristic such that a resistance value is high at a low temperature and is low at a high temperature.

Incidentally, this characteristic of the fixing image sensor 59 may be reversed in resistance value. The fixing temperature sensor 59 contacts the heater 54 and changes in resistance characteristic depending on the temperature of the surface of the heater 54. The fixing temperature sensor 59 is connected to the DC voltage Vcc1 via the resistor 121 at one end thereof and is connected to the GND at the other end thereof. To the CPU 94, a signal obtained by dividing the DC voltage Vcc1 by the resistor 121 and the fixing temperature sensor 59 (hereinafter, this signal is referred to as a Th signal) is connected. The Th signal is a signal of which voltage value changes depending on a change in resistor value of the fixing temperature sensor 59 depending on the temperature of the heater 54. On the basis of the Th signal changed depending on the temperature of the heater 54 and a target temperature value determined in advance, the CPU 94 selects an electric power control pattern inputted from an electric power control table described later to the heater 54. The CPU 94 outputs the FSRD signal on the basis of the electric power control pattern and a timing calculated from the zero-cross signal, and thus supplies the electric power from the AC power source 100 to the heater 54.

Figure 4:
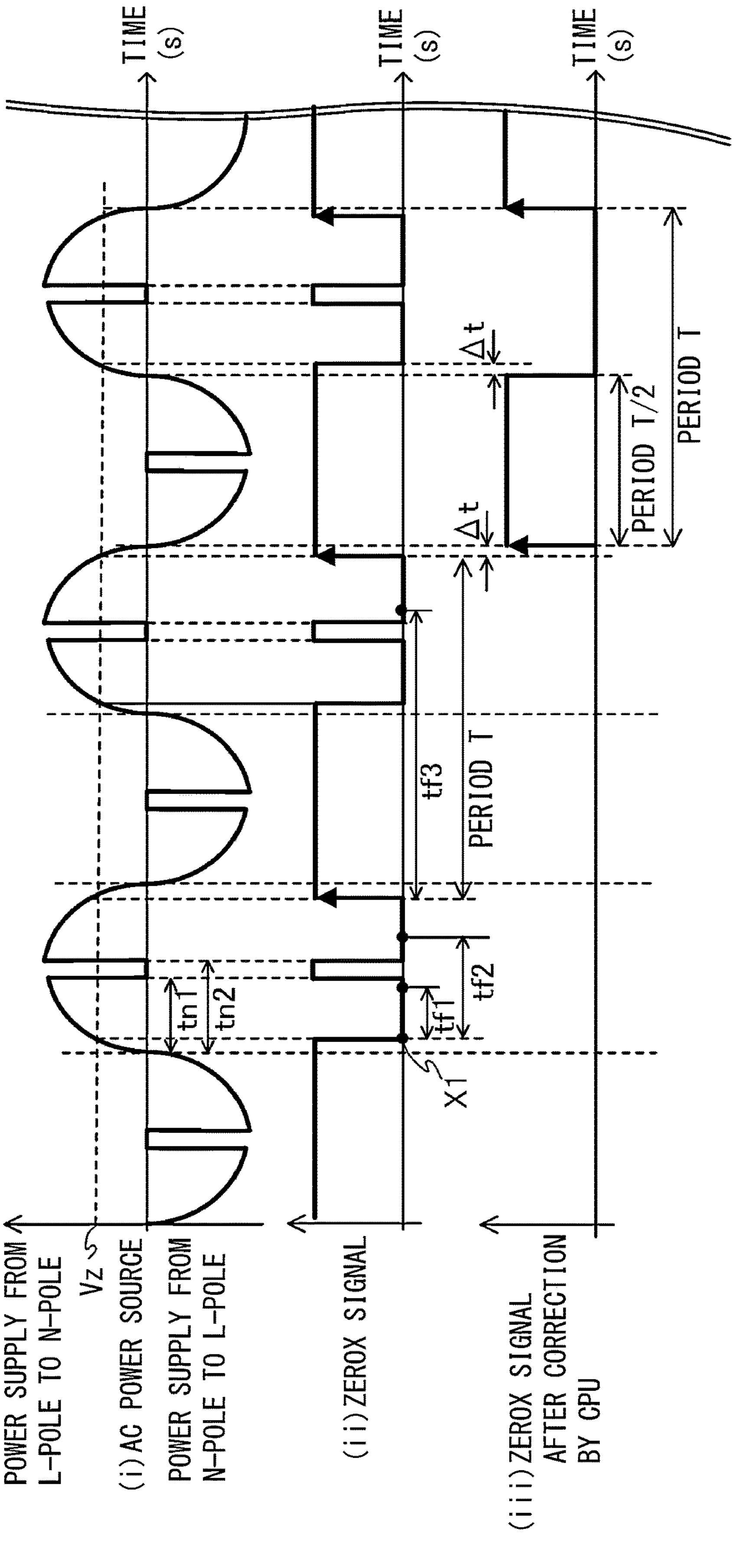
FIG. 4 is a relationship diagram of a ZEROX signal and a ZEROX signal after internal correction of a CPU in the embodiments 1 to 5.

Operation for Generating ZEROX Signal After Internal Correction by CP From Zero-Cross Signal FIG. 4 includes timing charts showing a relationship between the ZEROX signal inputted to the CPU 94 and a ZEROX signal corrected inside the CPU 94 (hereinafter referred to as ZEROX signal after internal correction by CPU). Part (i) of FIG. 4 shows a waveform of the AC voltage of the AC power source 100, in which the case of electric power supply from the L-pole to the N-pole is referred to as a positive polarity (first polarity) and the case of electric power supply from the N-pole to the L-pole is referred to as a negative polarity (second polarity). Further, Zener voltage Va of the Zener diode 108 is represented by a broken line. Part (ii) of FIG. 4 shows a waveform of the ZEROX signal outputted from the zero-cross circuit portion 971. Part (iii) of FIG. 4 shows a waveform of the ZEROX signal after the CPU 94 corrects the ZEROX. In each of parts (i) to (iii) of FIG. 4, the abscissa represents a time (s (seconds)).

In the case where the electric power is supplied from the N-pole of the AC power source 100, as described above, the ZEROX signal is still kept in the high-level state. When the electric power is supplied form the L-pole of the AC power source 100, the electric power is supplied from the AC power source 100 to the zero-cross circuit portion 971. Further, when the voltage of the AC power source 100 exceeds the Zener voltage Vz which is a voltage at which the photodiode 103*d* of the photocoupler 103 emits light, the zero-cross circuit portion 971 operate as described above. Then, the ZEROX signal changes from the high-level state to the low-level state. When the voltage supplied from the AC power source 100 lowers and the photodiode 103*d* of the photocoupler 103 is turned off, the ZEROX signal changes from the low-level state to the high-level state.

In FIG. 4, as the waveform of the AC voltage of the AC power source 100, an example in which a noise is superposed on the waveform in a period (tn2-tn1) from tn1 to tn2 based on a print at which a value of the AC voltage passes through 0 V (hereinafter, this point is referred to as the zero-cross point) is shown. In FIG. 4, the cyclic period of the AC power source is 20 ms, tn1 is 4.5 ms, and tn2 is 5.5 ms. When the CPU 94 detects X1 which is falling point of the ZEROX signal, the CPU 94 detects the ZEROX signal again after tf1 and after tf2 at a timing, as a reference, when the CPU 94 detected the falling point X1. When a logic (high-level or low-level) after either one of tf1 and tf2 from the falling point X1 detected by the CPU 94 is the low-level, the CPU 94 discriminates that the falling point X1 is a normal ZEROX signal which is not the noise.

In the case where both the logics after tf1 and after tf2 from the falling point X of the ZEROX signal detected by the CPU 94 are the high-levels, the CPU 94 discriminates that the falling point X1 is the noise and waits for detection of falling of the ZEROX signal again. When the CPU 94 detects the falling of the ZEROX signal, the CPU 94 neglects the detected signal for t2 seconds on the basis of rising of a subsequent ZEROX signal. The CPU 94 starts detection of a rising signal again after a lapse of the tf2 seconds from the rising of the ZEROX signal, and when the CPU 94 detects the rising of the subsequent ZEROX signal, an elapsed time from the rising of the last detected ZEROX signal is calculated as a cyclic period of the AC power source 100 by the CPU 94.

In FIG. 4, for example, tf3 is 16 ms, and the (cyclic) period T is 20 ms (frequency: 50 Hz). After the period T is calculated, a clock signal which repeats high level/low level in the period T is generated. Specifically, this clock signal is a signal such that the signal level changes from the high-level to the low-level at falling of the ZEROX signal and changes from the low-level to the high-level at a timing of a (cyclic) period T/2 from the falling of the ZEROX signal.

Further, the CPU 94 generates a signal in which a phase of the generated clock signal is quickened by Δt determined in advance (in the following, the thus-generated clock signal by the CPU 94 is referred to as a ZEROX after interval correction by CPU). By quickening the phase by Δt, the falling of the ZEROX signal is caused to coincide with a zero-cross point of the AC power source 100. In the embodiment 1, a deviation between the falling of the ZEROX signal and the zero-cross point of the AC power source 100 is, for example, 1.0 ms (millisecond), so that At is 1.0 ms. The CPU 94 outputs the FSRD signal on the basis of rising and falling of the ZEROX signal after internal correction by CPU as described above, and carries out ON/OFF control of the triac 56.

Electric Power Control Table

Figure 5:
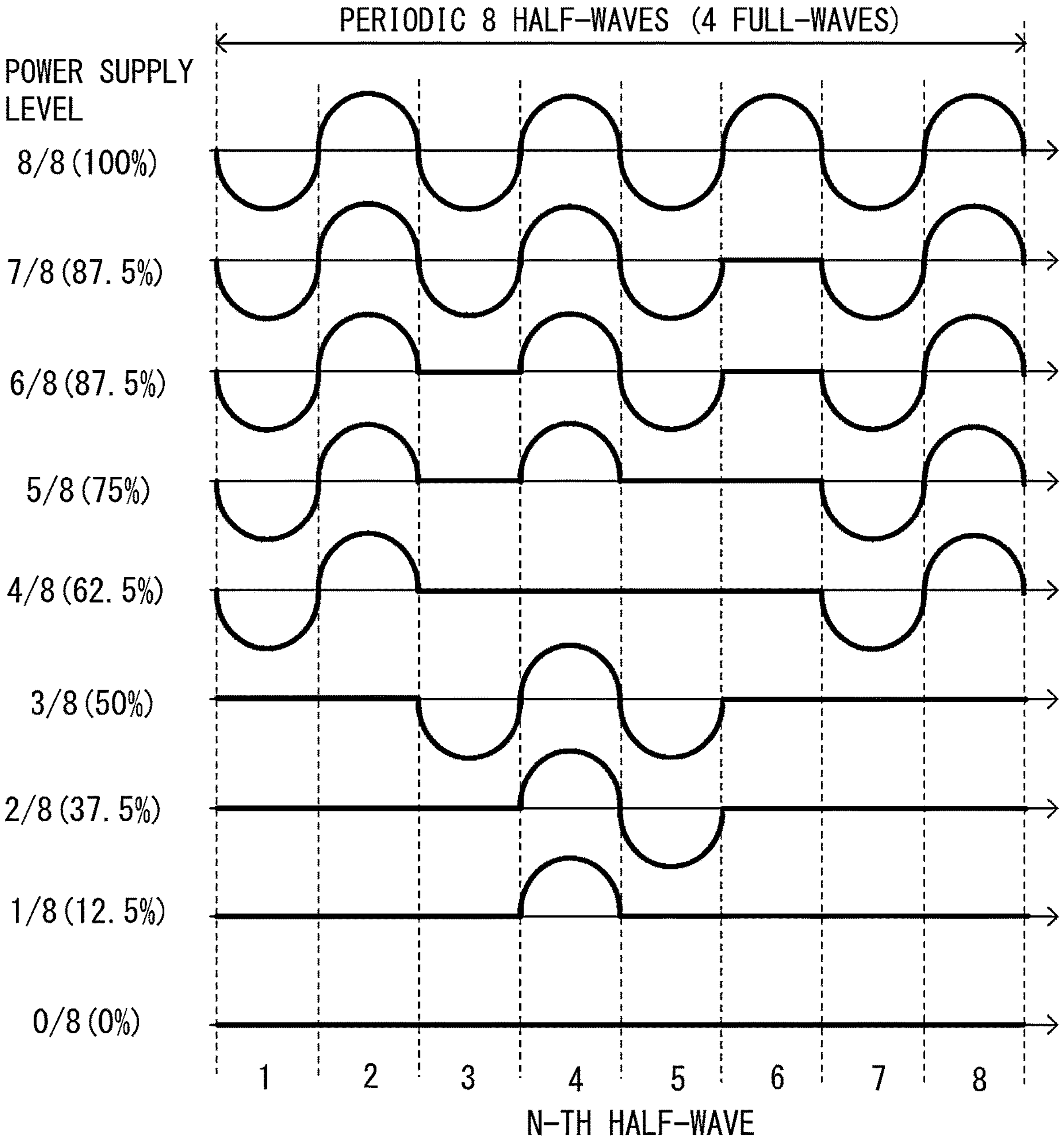
FIG. 5 is a schematic view showing a waveform of electric power supply to a heater in one (cycle) period of electric power control in the embodiments 1 to 5.

FIG. 5 is a table showing an electric power control pattern when the electric power is inputted (supplied) from the AC power source 100 to the heater 54, and this table is hereinafter referred to as an electric power control table. In this embodiment, four (4) full-waves consisting of eighth (8) half-waves constitute one (cyclic) period, and in one half-wave, whether the electric power is supplied to the heater 54 is combined, so that the electric power to be inputted (supplied) is divided into nine (19) levels (stages). On the basis of the above-described value of the Th signal and the target temperature value determined in advance, the CPU 94 selects which level of 0 to 8 levels in the electric power control table is to be employed. The CPU 94 carries out control of an electric power supply amount from the AC power source 100 to the heater 54 depending on whether or not the electric power in which half-wave (n-th half-wave) of the 8 half-waves in the 8 half-wave (cyclic) period. In the embodiment 1, the inputted electric power is divided into the 9 levels in a manner such that the electric power supply level is 8/8 (100%) in the case where the electric power is supplied to the heater 54 in all the 8 half-waves and is 0/8 (0%) in the case where the electric power is not supplied to the heater 54 in all the 8half-waves. For example, in the case of the electric power supply level of 4/8(62.5%), the electric power is supplied in the first half-wave, the second half-wave, the seventh half-wave, and the eighth half-wave of the 8 half-waves constituting one (cyclic) period. When the control in the 8 half-waves (one period) is ended, on the basis of the above-described value of the Th signal and the predetermined target temperature value, the CPU 94 determines the electric power control pattern again and repeats similar control.

Timing Chart of Conventional Constitution

Figure 6:
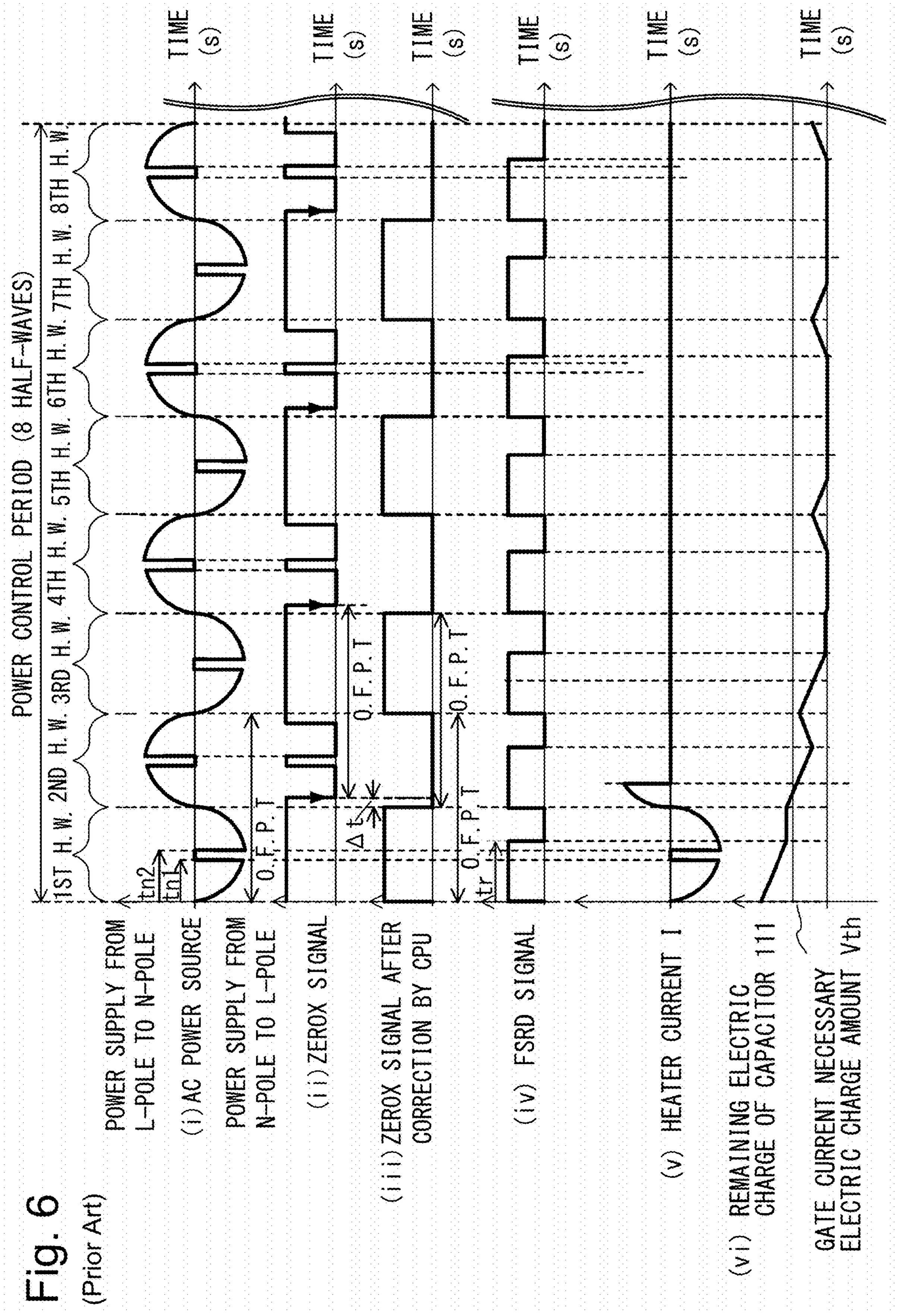
Fig. 6 (Prior Art)
FIG. 6 is a timing chart of electric power control in a conventional example for comparison with the embodiment 1.
Figure 7:
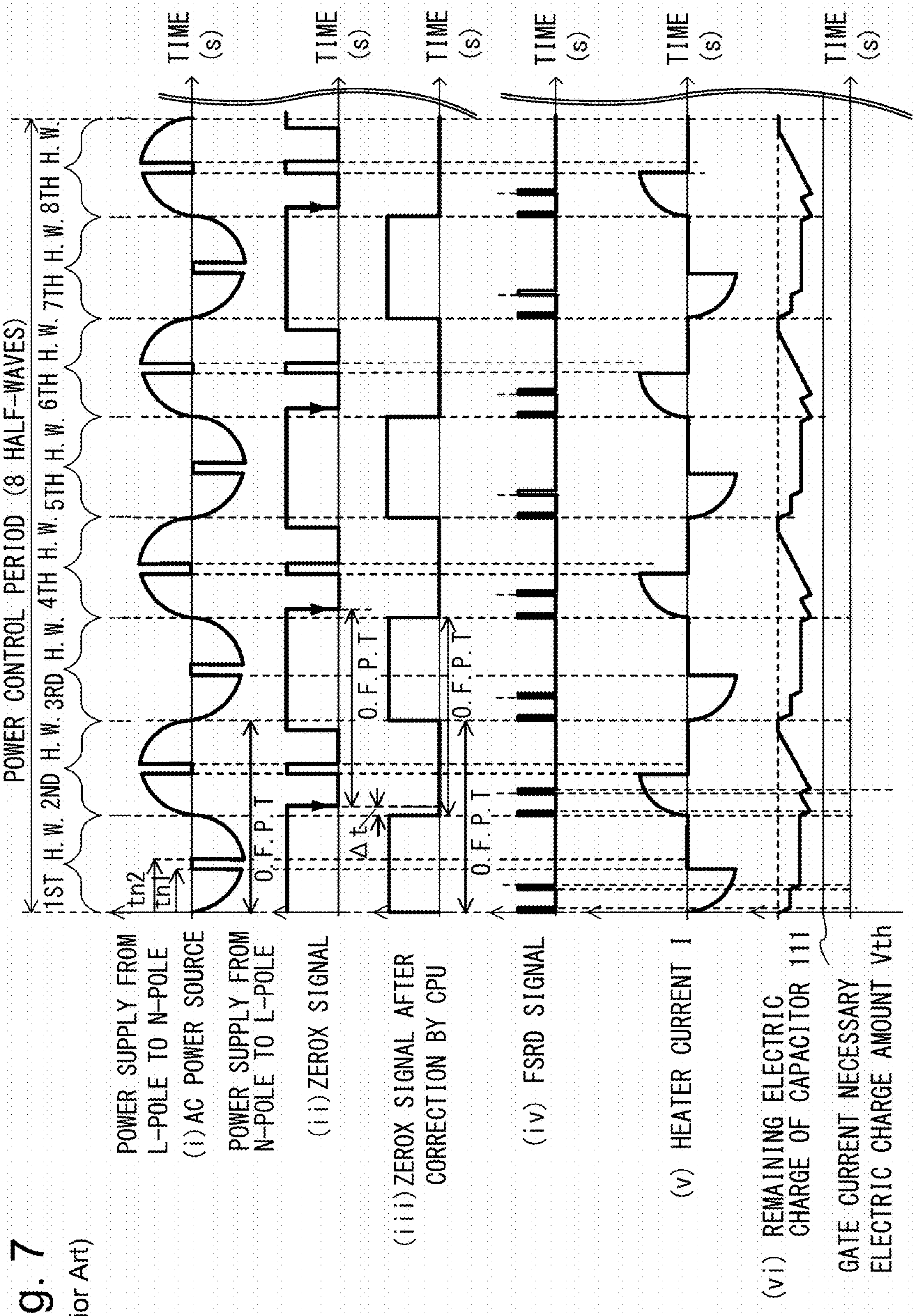
Fig. 7 (Prior Art)
FIG. 7 is a timing chart of electric power control in a conventional example for comparison with the embodiment 1.

Each of FIGS. 6 and 7 is a timing chart in the case where a conventional control operation is carried out. In both the FIGS. 6 and 7, part (i) shows a waveform of the AC voltage of the AC power source 100. Incidentally, the case where the electric power is supplied from the L-pole to the N-pole is positive, and the case where the electric power is supplied from the N-pole to the L-pole is negative. Part (ii) shows a waveform of the ZEROX signal outputted from the zero-cross circuit portion 971. Part (iii) shows a conventional waveform of the ZEROX signal after internal correction CPU. Part (iv) shows a waveform of the FSRD signal. Part (v) shows a waveform of the heater current I supplied to the heater 54. Part (vi) shows a remaining amount of electric charges of the capacitor 111 (hereinafter, this amount is referred to as a remaining charge amount). Incidentally, in part (vi), an electric charge amount necessary to cause the gate current Ig to flow is also shown. In FIGS. 6 and 7, the abscissa represents a time (seconds).

The conventional control operation will be described. FIG. 6 is a timing chart showing an operation in the case where the CPU 94 outputs the FSRD signal for a long time in one (single) half-wave. FIG. 6 shows the operation in a period corresponding to one (cyclic) period (8 half-waves) in the electric power control pattern in the case where the CPU 94 selects, for example, the eighth level (100%) of the electric power control pattern and carries out the electric power supply control. Here, when the control is carried out using the 8 half-waves as one (cyclic) period, this one (cyclic) period consisting of the 8 half-waves is referred to as an electric power control (cyclic) period. The AC power source 100 is 50 Hz in frequency and a waveform thereof is a sine wave of 100 V on which noise is superposed every 10 ms in the embodiment 1. That is, a (cyclic) period of the noise is 10 ms.

On the basis of the zero-cross point, the noise is superposed from after tn1 second(s) to after tn2(*s*). In FIGS. 6 and 7, tn1 is 4 ms and tn2 is 6 ms. The sine wave of the AC power source 100 is supplied to the electric power controller 97 from the first half-wave to the eighth half-wave with the (cyclic) period T(s). In the case where the electric power is supplied from the N-pole side of the AC power source 100, as shown in the above-described operation, the level of the ZEROX signal is still kept in the high-level state. As shown in FIG. 4, when the electric power is supplied from the L-pole side of the AC voltage source 100 and the voltage becomes the voltage Vz or more, the state of the ZEROX signal changes from the high-level state to the low-level state. Thereafter, a similar operation is repeated for each period T(s). The ZEROX signal after internal correction by CPU is generated on the basis of the ZEROX signal as described above with reference to FIG. 4.

Next, the FSRD signal, the heater current I, the remaining charge amount of the capacitor 111 will be described. The CPU 94 selects the electric power control pattern and determines a waveform pattern for supplying the electric power to the heater 54 in the electric power control period. When the waveform pattern is determined, the CPU 94 outputs the FSRD signal, generated by the above-described operation, for tr (=8 ms) on the basis of the ZEROX signal after internal correction by CPU. The CPU 94 outputs the FSRD signal for tr(s) and then outputs the FSRD signal for tr(s) in a subsequent half-wave on the basis of the ZEROX signal after internal correction by CPU, and then repeats this operation. When the FSRD signal is outputted by the CPU 94, by the above-described electric power control, the current is supplied to the heater 54.

As regards the AC power source 100, the noise is superposed from after tn1(*s*) to after tn2(*s*), and the triac 56 is turned off after tn1(*s*), and at the same timing, the supply of the electric power to the heater 54 is cut off. When the noise of the AC power source 100 disappears after tn2(*s*), the FSRD signal is outputted, and therefore, the triac 56 is turned on again and the supply of the electric power to the heater 54 is resumed, so that the current continuously flows through the heater 54 until the half-wave ends. The remaining charge amount of the capacitor 111 continuously decreases as described above during the output of the FSRD signal. Further, when the electric power is supplied from the L-pole to the N-pole of the AC power source 100, the remaining charge amount of the capacitor 111 is unchanged since the electric charges are maintained during non-output of the FSRD signal.

On the other hand, when the electric power is supplied from the N-pole to the L-pole of the AC power source 100, the electric charges are charged during the non-output of the FSRD signal, and therefore, the RCA increases. In FIG. 6, the remaining charge amount of the capacitor 111 continuously decreases in the first half-wave during the output of the FSRD signal from a start of the control when the electric power is supplied from the N-pole to the L-pole of the AC power source 100. When the FSRD signal is not outputted, the remaining charge amount of the capacitor 111 is maintained without being changed. In the second half-wave, when the electric power is supplied from the L-pole to the N-pole of the AC power source 100, the remaining charge amount of the capacitor 111 continuously decreases during the output of the FSRD signal.

When in the second half-wave, the remaining charge amount of the capacitor 111 is below Vth which is the (electric) charge amount necessary to supply the gate current Ig to the triac 56, the triac 56 is turned off.

When the triac 56 is turned off, the current cannot be supplied to the heater 54. Thereafter, when the output of the FSRD signal is stopped, the remaining charge amount of the capacitor 111 is increased until the second half-wave ends since the capacitor 111 charges the electric charge. Then, although the triac 56 is operated similarly as in the first half-wave and the second half-wave, in the capacitor 111, an electric charge increase amount by the charging becomes insufficient relative to an electric charge decrease by the output of the FSRD signal. For this reason, a state in which the gate current Ig cannot be supplied to the triac 56 is maintained, so that even when the FSRD signal is outputted the current I cannot be supplied to the heater 54.

Thus, in FIG. 5, in one half-wave, the FSRD signal is continuously outputted for a long time, and therefore, even when the noise is superposed on the waveform of the AC power source 100, the triac 56 is immediately restored to the ON state. However, when the electric charge decrease amount of the capacitor 111 is large and is below the electric charge amount Vth necessary to supply the gate current Ig, the heater current I cannot be supplied to the heater 54 in the second half-wave and later.

FIG. 7 is a timing chart showing an operation in the case where the CPU 94 outputs the FSRD signal in one half-wave at the same phase in a plurality of times. The operation until the FSRD signal is similar to the above-described operation and will be omitted from description. The FSRD signal is outputted for 200 μs from a start of one half-wave and then is outputted again for 200 μs with an interval of 2 ms therebetween. In the second half-wave, the remaining charge amount of the capacitor 111 continuously decreases during the output of the FSRD signal. Other operations are similar to those in FIG. 6. The heater current I is supplied since the triac 56 is turned on when the FSRD signal is outputted at a start of one half-wave. However, after the FSRD signal is outputted second in one half-wave, and the level thereof changes to the low level. Then, when the noise superposed on the waveform of the AC power source 100 generates after tn1(*s*) from the zero-cross point, the triac 56 is turned off.

Thus, in FIG. 7, an output time of the FSRD signal in one half-wave, and therefore, a decrease in remaining charge amount of the capacitor 111 is small. For this reason, the remaining charge amount of the capacitor 111 is maintained at a level which is not less than the Vth necessary to supply the gate current Ig to the triac 56. However, when the noise superposed on the waveform of the AC power source 100 generates, after generation of the noise and later, the triac 56 is put in the OFF state, so that the heater current I to the heater 54 is not supplied.

Timing Chart in Embodiment 1

Figure 8:
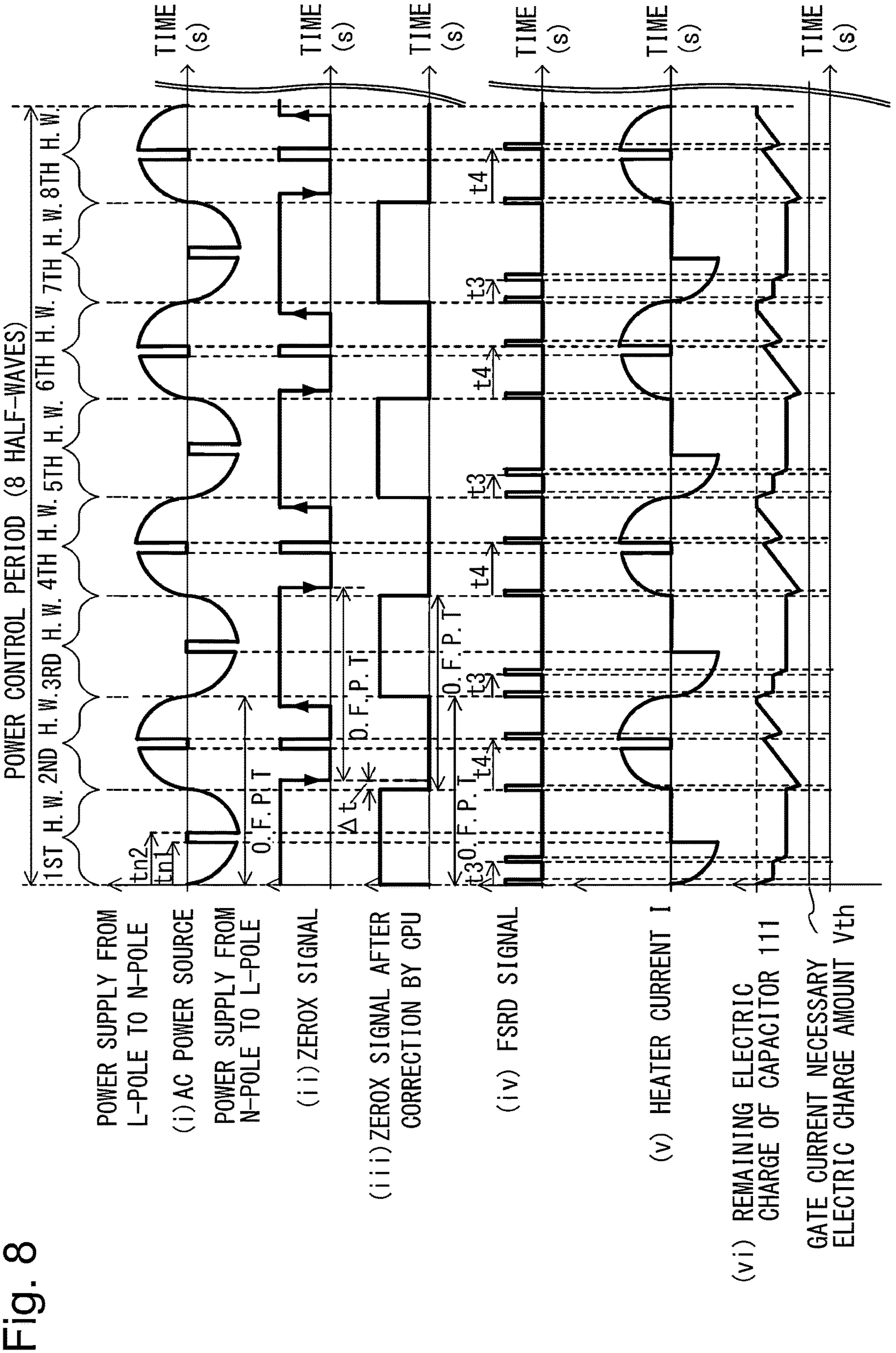
FIG. 8 is a timing chart of electric power control in the embodiment 1.

FIG. 8 is a timing chart showing the waveform of the AC power source 100, the ZEROX signal, the ZEROX signal after internal correction by CPU, the remaining (electric) charge amount of the capacitor 111, the FSRD signal, and a state the heater current I supplied to the heater 54 flows in the embodiment 1. Parts (i) to (vi) of FIG. 8 are charts similar to those in FIGS. 6 and 7. In FIG. 8, the operation in the electric power control period (one period consisting of 8 half-waves) in the case where the CPU 94 selects the electric power supply level 8/8 (100%) in the electric power control table of FIG. 5 described above and carries out the control.

The operation until the CPU 94 generates the ZEROX signal after internal correction by CPU is similar to the above-described operation and will be omitted from description.

(FSRD Signal)

First, the operation of the FSRD signal in the embodiment 1 will be described. In the embodiment 1, the FSRD signal is outputted for 200 μs two times in one half-wave. A timing when the FSRD signal is outputted first in one half-wave by the CPU 94 is a period of 200 μs from the zero-cross point. A timing when the FSRD signal is outputted second in one half-wave includes two kinds consisting of the case of after t3(*s*) which is a first phase from the zero-cross point and the case of after t4(*s*) which is a second phase from the zero-cross point, and in each of the first and second phases, the FSRD signal is outputted for 200 μs. Whether to output which FSRD signal second in one half-wave is updated and determined by the CPU 94 at a break of the above-described electric power control period. In FIG. 8, the FSRD signal outputted second in one half-wave by the CPU 94 is outputted after t3(*s*) in the first half-wave, after t4(*s*) in the second half-wave, after t3(*s*) in the third half-wave, after t4(*s*) in the fourth half-wave, . . . That is, the FSRD signal outputted by the CPU 94 is outputted while changing the phase for each electric power supply in one half-wave in such a manner that the timing is alternately changed between after t3(*s*) and after t4(*s*) for each one half-wave. Then, after the electric power control period (8 half-waves), the timing is updated together with the above-described electric power supply level by the CPU 94. In the embodiment 1, t3 is 3.0 ms, and t4 is 6.0 ms.

In the first half-wave, on the basis of the zero-cross point, the CPU 94 outputs a first control signal (first FSRD signal) for a first time (200 μs). Then, the CPU 94 outputs a second control signal (second FSRD signal) for the first time at a timing different from the timing of the first control signal on the basis of the zero-cross point. In the second half-wave, on the basis of the zero-cross point, the CPU 94 outputs a third control signal (first FSRD signal) for the first time (200 ms). Then, the CPU 94 outputs a fourth control signal (second FSRD signal) for the first time at a timing different from the timing of the third control signal on the basis of the zero-cross point. The second control signal and the fourth control signal (second FSRD signals) are outputted at timings (t3 for the first half-wave and t4 for the second half-wave) different from each other for each plurality of half-waves. The CPU 94 outputs the second control signals in odd-numbered half-waves in the control period at the timing of a second time (for example, t3) from the associated zero-cross point, and outputs the fourth control signals in even-numbered half-waves in the control period at the timing of a third time (for example, t4), different from the second time, from the associated zero-cross point. Incidentally, in the control period, although the odd-numbered half-waves are outputted as an AC voltage of a negative polarity and the even-numbered half-waves are outputted as an AC voltage of a position polarity, depending on a state of discharging/charging for the capacitor 111, a relationship between the number (odd-number/even-number) of the half-waves and the (negative/positive) polarity of the AC voltage may also be reversed. In the embodiment 1, the AC voltage of the positive polarity at which the capacitor 111 charges the electric charge constitutes each of the odd-numbered half-waves in the control period.

(Heater Current I)

Next, an operation of the heater current I will be described. In the first half-wave, as described above with reference to FIG. 4, when the FSRD signal is outputted first in the above-described one (single) half-wave, the electric power is supplied from the AC power source 100, so that the heater current I flows. Even when the FSRD signal is outputted after t3(*s*) from the zero-cross point, as described above, the state in which the triac 56 is turned on is maintained, so that the current is continuously supplied to the heater 54 as it is. When the noise is generated in the waveform of the AC power source 100 after tn1(*s*) from the zero-cross point, the triac 56 is turned off, and thus the current is not supplied to the heater 54, so that the OFF state is maintained to a subsequent zero-cross point where the first half-wave ends.

In the second half-wave, similarly as in the first half-wave, when the FSRD signal is outputted first, by the above-described electric power supply circuit, the electric power is supplied from the AC power source 100 to the heater 54, so that the heater current I starts to flow.

In a period from after tm1 to after tn2 on the basis of the zero-cross point, the noise is superposed on the waveform of the AC power source 100, so that the triac 56 is turned off, and therefore, the electric power is not supplied to the heater 54, and thus the heater current becomes 0 (A). After t4(*s*) from the zero-cross point which is a start point of the second half-wave, when the FSRD signal is outputted again by the CPU 94, the triac 56 is turned on by the above-described operation of the electric power controller 97. By this, the electric power is supplied again to the heater 54, so that the heater current I starts to flow, and thereafter, continuously flows until the second half-wave ends.

Thereafter, similarly as described above, from the third half-wave to the 8 half-wave, the operations similar to those in the first half-wave and the second half-wave are repeated. Thus, for each of the half-waves, the CPU 94 outputs the FSRD signals at different timings. By this, in the case where the noise is superposed on the waveform of the AC power source 100, while preventing the influence of the turning-off of the triac 56 due to the noise as can as possible, the electric power supply to the heater 54 can be controlled substantially continuously in entirety of the single (one) electric power control period.

(Electric Charge Amount of Capacitor)

Finally, a fluctuation in electric charge amount of the capacitor 111 will be described. In an initial state of FIG. 8, the capacitor 111 charges the electric charge to a certain degree. When the FSRD signal is outputted in the high-level state, similarly as in the first half-wave, the current flows from the capacitor 111 to the gate of the triac 56 by the above-described operation, so that the electric charges decrease. As in the first, third, fifth, and seventh half-waves, in the case where the electric power is supplied from the N-pole side of the AC power source 100, the electric charges are not charged to the capacitor 111 and are not consumed, and therefore, a value is maintained in a period in which the FSRD signal is not outputted. In the first half-wave, when the FSRD signal is outputted again after t3(*s*) from the zero-cross point, the electric discharge is made and therefore, the electric charges are decreased, so that when the level of the FSRD signal changes to the low level, the value is maintained at a certain value to a subsequent zero-cross point.

At the zero-cross point of the second half-wave, when the FSRD signal is outputted in the high-level state, similarly as in the first half-wave, the current flows from the capacitor 111 to the gate of the triac 56, so that the electric charges decrease. As in the second, fourth, sixth, and eighth half-waves, in the case where the electric power is supplied from the L-pole side of the AC power source 100, the electric charges are charged to the capacitor 111. For this reason, in a period in which the FSRD signal is not outputted, the capacitor 111 charges the electric charge, so that the value of the remaining charge amount increases. In the second half-wave, after the FSRD signal is outputted for 200 us from the zero-cross point, the remaining charge amount of the capacitor 111 is increased by the charging of the capacitor 111. When the FSRD signal is outputted again by the CPU 94 for 200 μs after t4(*s*) from the zero-cross point, the remaining charge amount of the capacitor 111 is decreased because of the electric discharge during the output of the FSRD signal. When the output of the FSRD signal is stopped and the level of the FSRD signal changes to the low level, the capacitor 111 charges the electric charge again, so that the remaining charge amount of the capacitor 111 increases.

Also, in the third half-wave and later, the operations similar to those in the first half-wave and the second half-wave are repeated. Thus, compared with the conventional operations, the output time of the FSRD signal in the single (one) half-wave is short, and therefore, a decrease in remaining charge amount value of the capacitor 111 due to the electric discharge can be suppressed to a minimum level. Further, the remaining charge amount of the capacitor 111 is not below the gate current necessary electric charge amount Vth of the triac 56, so that the electric power control can be continued.

Flowchart of Electric Power Control in Embodiment 1

Figure 9:
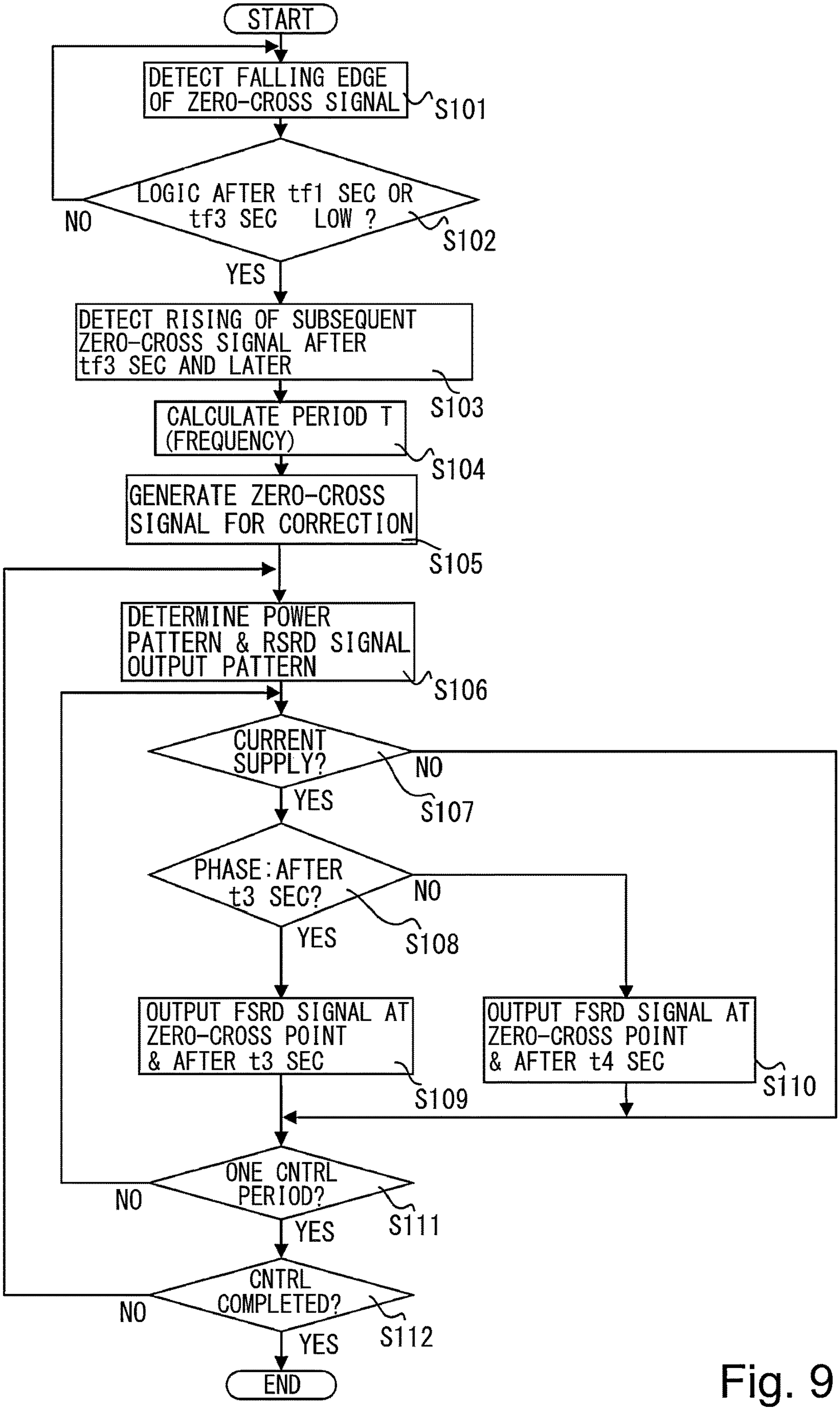
FIG. 9 is a flowchart of the electric power control in the embodiment 1.

FIG. 9 is a flowchart showing the operation of the CPU 94 in the embodiment 1. In a step S101, the CPU 94 detects a falling edge of the zero-cross signal inputted from the zero-cross circuit portion 971. In S102, the CPU 94 discriminates whether or not a logic of the zero-cross signal is the low level (LOW) after tf1(*s*) or after tf2(*s*) from the falling edge. In the case where the CPU 94 discriminates in S102 that the logic of the zero-cross signal after each of the tf1(*s*) and tf2(*s*) is a high level, the CPU 94 returns the process to S101. In the case where the CPU 94 discriminated in S102 that the logic of the zero-cross signal after the tf1(*s*) or after the tf2(*s*) is the low level, the CPU 94 causes the process to go to S103.

In S103, the CPU 94 detects rising of a subsequent zero-cross signal after tf3(*s*) and later from a rising signal of the zero-cross signal which is subsequently detected. In S104, the CPU 94 calculates a cyclic period T (in other words, a frequency) on the basis of a time from falling of the zero-cross signal to the rising of the subsequently detected zero-cross signal. In S105, the CPU 94 generates a clock signal of the cyclic period T in an inside thereof. After the CPU 94 calculates the period T, the CPU 94 generates a ZEROX signal after interval correction by CPU in which a phase of the generated clock side is made earlier by δt determined in advance.

In S106, on the basis of the Th signal inputted from the fixing temperature sensor 59 and the predetermined target temperature value which are described above, the CPU 94 selects the electric power control pattern inputted from, for example, the electric power control table of FIG. 5 to the heater 54. Further, the CPU determines an output phase (output pattern) of the FSRD signal in each half-wave in the selected electric power control pattern. In the embodiment 1, in the case where the electric power is supplied from the N-pole to the L-pole, the CPU 94 outputs the FSRD signal two times in one (single) half-wave in the neighborhood of the zero-cross point and after t3(*s*) from the zero-cross point. On the other hand, in the case where the electric power is supplied from the L-pole to the N-pole, the CPU 94 outputs the FSRD signal two times in one half-wave in the neighborhood of the zero-cross point and after t4(*s*) from the zero-cross point.

In S107, the CPU 94 starts the electric power control and discriminates, from the electric power control pattern selected in S106, whether or not to supply the heater current I to the heater 54 in a subsequent half-wave. In the case where the CPU 94 discriminated in S107 that the electric power is not supplied to the heater 54 in the subsequent half-wave, the CPU 94 causes the process to go to S111. In S111, the CPU 94 discriminates whether or not the electric power control period is completed. In S111, in the case where the CPU 94 discriminated that the electric power control period is not completed, i.e., in the case where the electric power control period is still continued, the CPU 94 returns the process to S107. In S111, in the case where the CPU 94 discriminated that the electric power control period is completed, the CPU 94 causes the process to go to S112.

In S107, in the case where the CPU 94 discriminated that the electric power is supplied to the heater 54 in the subsequent half-wave, the CPU 94 causes the process to go to S108. In S108, the CPU 94 discriminates, from the output phase of the FSRD signal determined in S106, whether or not the FSRD signal in the subsequent half-wave is outputted at which phase. In the embodiment 1, the CPU 94 discriminates whether or not to output the FSRD signal two times in the neighborhood of the zero-cross point and after t3(*s*) from the zero-cross point. In S108, in the case where the CPU 94 discriminated that the output phase of the second FSRD signal is after t3(*s*), the CPU 94 causes the process to go to S109, and in the case where the CPU 94 discriminated that the output phase of the second FSRD signal is not after t3(*s*), the CPU 94 causes the process to go to S110.

In S109, in the case where the electric power is supplied from the N-pole toward the L-pole of the AC power source 100 through the heater 54, the CPU 94 outputs the FSRD signal two times in one half-wave in the neighborhood of the zero-cross point and after t3(*s*) from the zero-cross point, and then causes the process to go to S111. In S110, in the case where the electric power is supplied from the L-pole toward the N-pole of the AC power source 100 through the heater 54, the CPU 94 outputs the FSRD signal two times in one half-wave in the neighborhood of the zero-cross point and after t4(*s*) from the zero-cross point, and then causes the process to go to S111.

In S112, the CPU 94 discriminates whether or not the electric power supply control to the heater 54 is completed. In S112, in the case where the CPU 94 discriminated that the electric power supply control is not completed, i.e., in the case where the electric power supply control to the heater 54 is still continued, the CPU 94 returns the process to S106. In S112, in the case where the CPU 94 discriminated that the electric power supply control is completed, the CPU 94 ends the control while keeping the level of the FSRD signal at the changed low level.

As described above, in the embodiment 1, the FSRD signal is outputted in a necessary minimum time in one half-wave while being changed in phase. By this, a time in which the triac 56 is turned off due to the noise superposed on the waveform of the AC power source 100 while preventing a decrease in electric charge of the capacitor 111 and maintaining a necessary electric charge amount is minimized as can as possible, so that the electric power supply to the heater 54 is substantially continued in the electric power control period.

As described above, in a circuit such that the gate current is supplied to the bidirectional thyristor from the power source provided separately from the AC power source, the bidirectional thyristor can be continuously controlled by a simple means while suppressing an increase in cost and avoiding the influence due to the distortion of the AC power source and the noise.

Embodiment 2

In embodiment 1, the FSRD signal in a short time was outputted two times in one half-wave and the phase of the FSRD signal outputted second was changed for each one half-wave. By this, a decrease amount of the electric charges of the capacitor 111 was suppressed, so that the influence in the case where the noise is superposed on the waveform of the AC power source 100 was prevented as can as possible. In an embodiment 2, compared with the embodiment 1, as a constitution in which heat generation of the resistor 120 (hereinafter, referred to as a charging resistor 120) of FIG. 3 described above is suppressed, a constitution in which the resistance value of the charging resistor 120 is larger than the resistance value of the resistor 120 in the embodiment 1 will be described. When the resistance value of the charging resistor 120 becomes large, the heat generation of the charging resistor 120 can be suppressed, but an amount of electric charges capable of being charged per unit time in the capacitor 111 becomes small. A method in which the electric power control of the triac 56 is continued by suppressing an zero-cross decrease amount even in such a case that the amount of zero-crosses capable of being charged in the capacitor 111 in one half-wave is small will be described. In the embodiment 2, the AC power source 100 is a power source for outputting a sine wave of 100 V and 50 Hz. Further, the charging resistance in the embodiment 2 is 13 kΩ compared with 5.4 kΩ in the embodiment 1. Other circuit operations are similar to those in the embodiment 1, and in the embodiment 2, will be omitted from description.

Timing Chart

Figure 10:
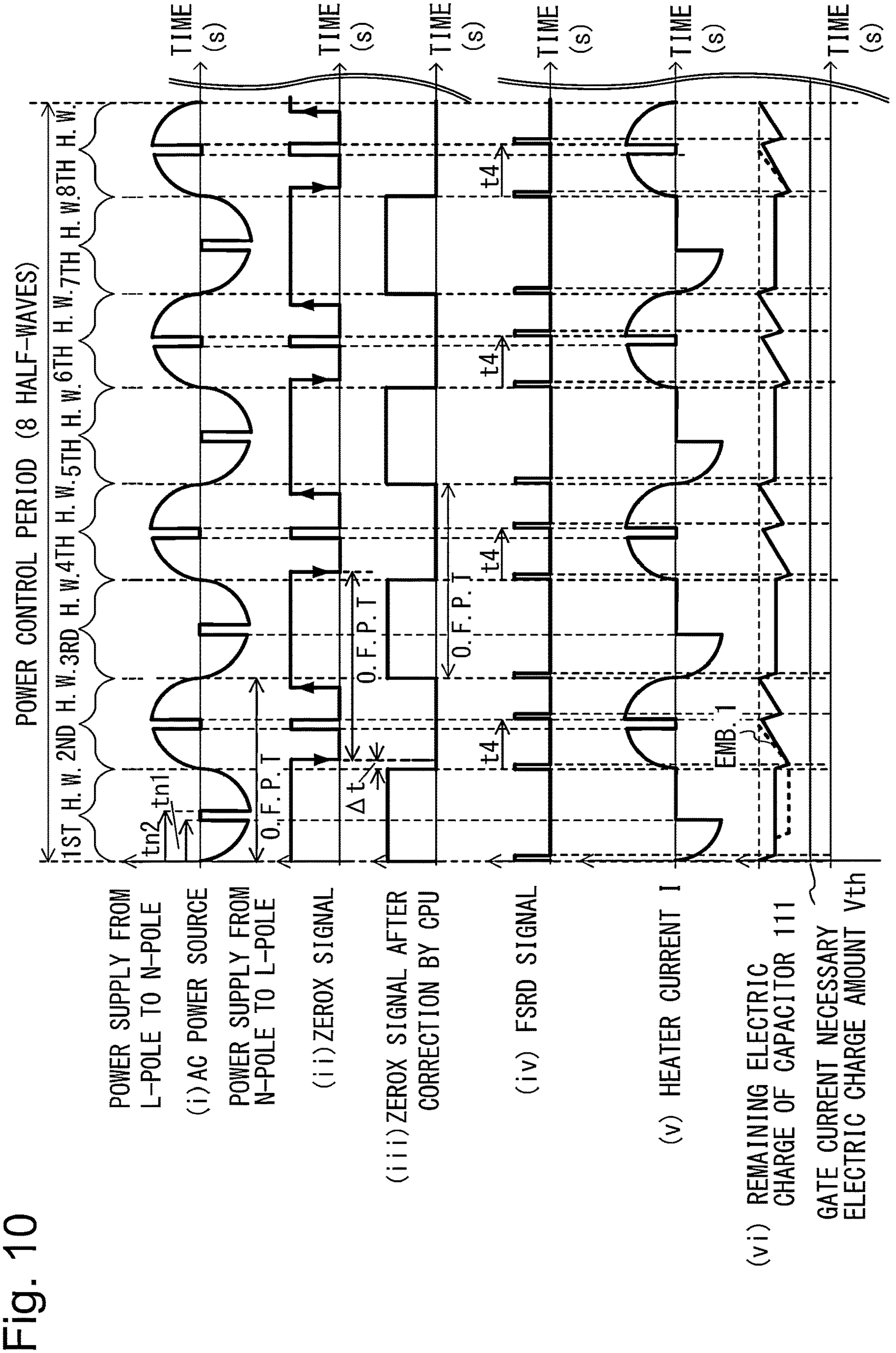
FIG. 10 is a timing chart of electric power control in the embodiment 2.

FIG. 10 is a timing chart showing the waveform of the AC power source 100, the ZEROX signal, the ZEROX signal after internal correction by CPU, the remaining (electric) charge amount of the capacitor 111, the FSRD signal, and a state the heater current I supplied to the heater 54 flows in the embodiment 2. Parts (i) to (vi) of FIG. 10 are charts similar to those in FIGS. 6 and 7. In the embodiment Parts (i) to (vi) of FIG. 8 are charts similar to those in FIGS. 6 and 7. In the embodiment 2, operations other than those of the FSRD signal, the heater current I, and the remaining charge amount of the capacitor 111 are similar to those in the embodiment 1, and therefore, description similar to the description in the embodiment 1 will be omitted.

First, the FSRD signal and the heater current I will be described. In the embodiment 2, the process until the CPU 94 generates the ZEROX signal after internal correction by CPU and selects the above-described electric power supply level 8/8 (100%) in the electric power control table of FIG. 5 and then is operated in the electric power control period (one cyclic period (8 half-waves)) are similar to the process in the embodiment 1. In each of the first, third, fifth, and seventh half-waves, on the basis of the above-described FSRD signal after internal correction by CPU, the CPU 94 outputs the FSRD signal for 200 µs from the zero-cross point. Thereafter, the level of the FSRD signal is changed to the low level to the zero-cross point of a subsequent half-wave, and then the operation of the FSRD signal is stopped. The control in this embodiment is different in this point from the control in the embodiment 1 in which in each of the first, third, fifth, and seventh half-waves, the second FSRD signal is outputted after t3(*s*) from the output of the first FSRD signal. In the embodiment 2, in the half-wave in which the capacitor 111 is discharged, the output of the FSRD signal is decreased (specifically once).

That is, the CPU 94 changes the number of times in which the driving signal is outputted for each plurality of half-waves in the control period. In the odd-numbered half-wave (first half-wave) in the control period, on the basis of the zero-cross point, the CPU 94 outputs the control signal once (first number of times) for a first time (output of the first number of times). In the even-numbered half-wave (second half-wave) in the control period, on the basis of the zero-cross point, the CPU 94 outputs a first control signal for the first time and outputs a second control signal for the first time at a timing different from the timing of the first control signal. That is, the CPU 94 outputs the control signals twice in total (second number of times) (output of the second number of times). Incidentally, in the case where the capacitor 111 charges the electric charge in the half-wave of the negative polarity, in the even-numbered half-wave in the control period, the CPU 94 may output the control signal only once for the first time on the basis of the zero-cross point. Further, in the odd-numbered half-wave in the control period, on the basis of the zero-cross point, the CPU 94 outputs the first control signal for the first time and outputs the second control signal for the first time at a timing different from the timing of the first control signal. That is, the CPU 94 may output the control signals twice in total in the odd-numbered half-wave.

When the FSRD signal is outputted by the CPU 94, the triac 56 is turned on by the above-described electric power controller 97, so that the heater current I flows. When the noise superposed on the waveform of the AC power source 100 generates after tn1(*s*) from the first zero-cross point of the first half-wave, the triac 56 is turned off, so that the heater current I does not flow until the FSRD signal is outputted first in the second half-wave at a subsequent zero-cross point. In each of the second, fourth, sixth, and eighth half-waves, the operations of the FSRD signal and the heater current I are similar to those in the embodiment 1. That is, each of the second, fourth, sixth, and eighth half-waves, the second FSRD signal is outputted after t4(*s*) from the output of the first FSRD signal. Also, in the embodiment 2, similarly as in the embodiment 1, tn1 is 4 ms, tn2 is 6 ms, and t4 is 6 ms.

Next, the remaining charge amount of the capacitor 111 will be described. In the first half-wave and the second half-wave, a thick broken line represents a change in remaining charge amount during the charging of the capacitor 111 in the case where the charging resistor 120 is 5.4 kΩ in the embodiment 1. In the first half-wave, the remaining charge amount of the capacitor 111 is decreased by discharge of the electric charges during the output of the FSRD signal, and is maintained during non-output of the FSRD signal without being changed to the subsequent zero-cross point.

In the second half-wave, during the output of the FSRD signals in the neighborhood of the zero-cross point and after t4(*s*) from the zero-cross point, the remaining charge amount of the capacitor 111 decreases. In the case where the FSRD signal is not outputted, the capacitor 111 charges the electric charge, so that the remaining charge amount increases.

In the embodiment 2, the electric charge amount in which the electric charges can be charged per unit time is smaller than the electric charge amount in the embodiment 1, and therefore, an electric charge increase amount of the capacitor 111 in the second half-wave is small. That is, a gradient of the increase in remaining charge amount of the capacitor 111 in the second half-wave is more moderate in a solid line in the embodiment 2 than in the broken line in the embodiment 1 (FIG. 10). However, the number of output times of the FSRD signals outputted by the CPU 94 in the first half-wave is small, and therefore, the remaining charge amount of the capacitor 111 when the control in the second half-wave is started becomes large. For this reason, even when the charging amount of the capacitor 111 per unit time in the second half-wave is small, the decrease in electric charge when the control in the second half-wave is ended is suppressed. In the third half-wave and later, the operations similar to those in the first half-wave and the second half-wave are repeated. Even at a point of time when the control in the eighth half-wave is ended, the remaining charge amount of the capacitor 111 is maintained, so that the control can proceed to a subsequent electric power control period while keeping the remaining charge amount at an amount exceeding Vth which is the zero-cross amount necessary to cause the gate current to flow through the triac 56.

As described above, in the embodiment 2, the FSRD signal outputted with a necessary minimum time duration is outputted for each one half-wave while being changed in number of output time. By doing so, even in the case where the charging amount per unit time is small, the following operation can be formed. That is, the influence of turning-off of the triac 56 due to the noise superposed on the waveform of the AC power source 100 while preventing a decrease in electric charge of the capacitor 111 and maintaining a necessary electric charge amount is minimized as can as possible, so that the electric power supply to the heater 54 can be made substantially continuously in the electric power control period. Further, the heat generation of the charging resistor 120 can also be reduced.

As described above, in a circuit such that the gate current is supplied to the bidirectional thyristor from the power source provided separately from the AC power source, the bidirectional thyristor can be continuously controlled by a simple means while suppressing an increase in cost and avoiding the influence due to the distortion of the AC power source and the noise.

Embodiment 3

In embodiment 2, the FSRD signal in a short time was outputted while changing the number of output times for each half-wave. By this, the necessary electric charge amount is maintained while suppressing the heat generation of the charging resistor 120, and thus the influence of the noise of the AC power source 100 is minimized as can as possible, so that the electric power supply to the heater 54 is controlled. Such a constitution was described. In a third embodiment, control such that the FSRD signal in a short time is changed in number of output times for each one half-wave and that an output phase is also changed will be described. Even in the case where the phase of the FSRD signal coincides with the phase of the noise of the AC power source 100 while suppressing the heat generation of the charging resistor 120, by changing the phase of the FSRD signal.

Timing Chart

Figure 11:
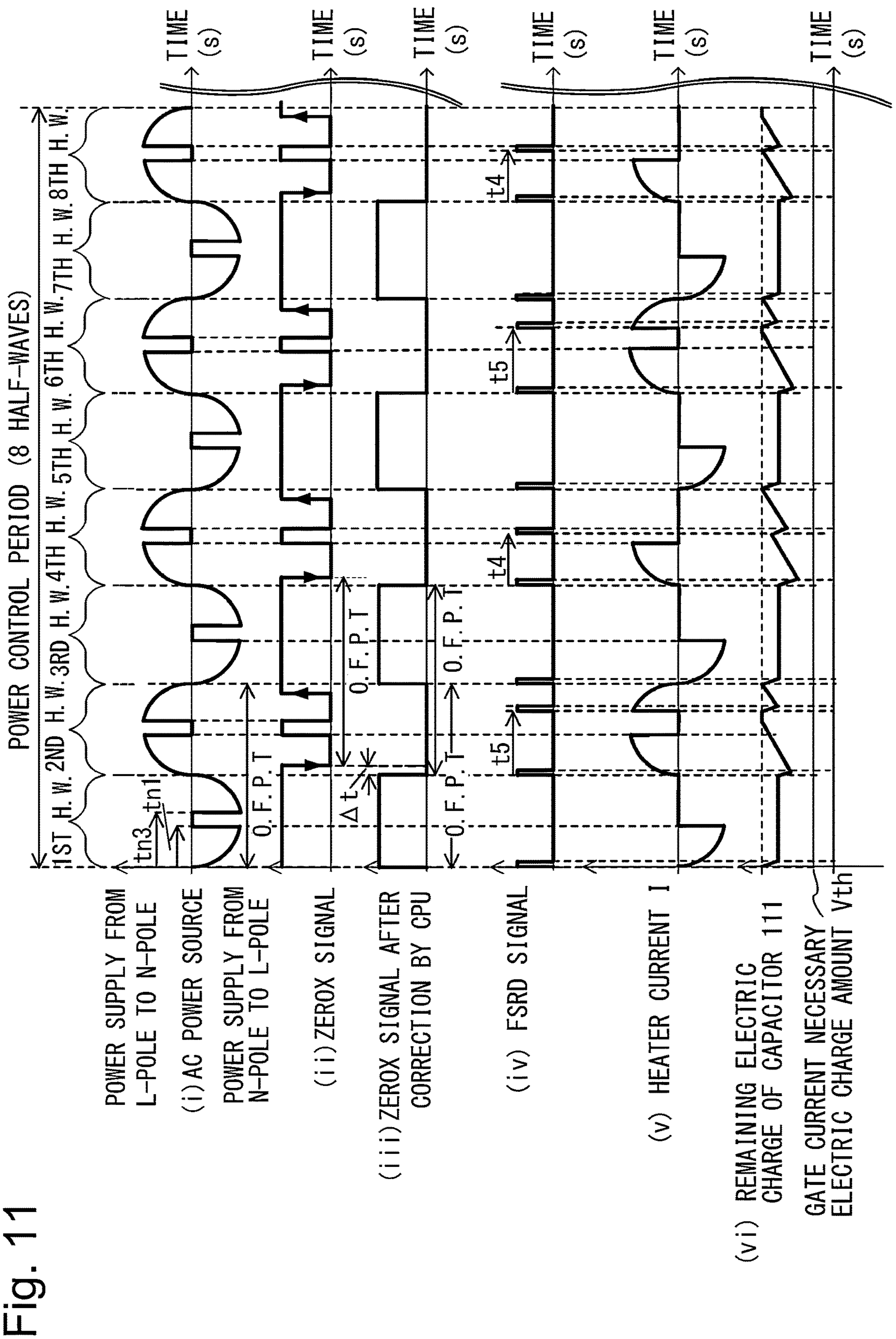
FIG. 11 is a timing chart of electric power control in the embodiment 3.

FIG. 11 is a timing chart showing an operation in the embodiment 3, and parts (i) to (vi) of FIG. 11 are timing charts similar to those in FIGS. 6 and 7. On a waveform of the AC power source 100 of 50 Hz in frequency, the noise is superposed from tn1=4.5 ms to tn3=7.0 ms each from the zero-cross point. That is, the time of superposition of the noise becomes longer than those in the embodiments 1 and 2. Other operations until the ZEROX signal after internal correction by CPU is generated are similar to those in the embodiments 1 and 2 and will be omitted from similar description.

First, the operations of the FSRD signal and the heater current I will be described. In the first half-wave, the CPU 94 outputs the FSRD signal for 200 μs from the zero-cross point. When the CPU 94 outputs the FSRD signal, the triac 56 is turned on, so that the current I is caused to flow through the heater 54 by the above-described electric power controller 97. When the noise is superposed on the waveform of the AC power source 100 after tn1(*s*) from the zero-cross point, the triac 56 is turned off, and thus the electric power supply to the heater 54 is stopped, so that the heater current I becomes 0 to the subsequent zero-cross point.

In the second half-wave, similarly as in the first half-wave, the CPU 94 outputs the FSRD signal for 200 us from the zero-cross point and the triac 56 is turned on again, so that the heater current I starts to flow. When the noise is superposed on the waveform of the AC power source 100 after tn1(*s*) from the zero-cross point, the triac 56 is turned off, so that the electric power supply to the heater 54 is stopped. The noise disappears until after tn3(*s*), and when the CPU 94 outputs the FSRD signal after t5(*s*), the triac 56 is put in the ON state again by the operation of the operation of the electric power controller 97, so that the heater current I continuously flows to the subsequent zero-cross point.

In the third half-wave, the operation is performed similarly as in the first half-wave. In the fourth half-wave, similarly as in the first to third half-waves, the CPU 94 outputs the FSRD signal in the neighborhood of the zero-cross point, so that the triac 56 is put in the ON state and the heater current I starts to flow. When the noise is superposed on the waveform of the AC power source 100 after tn1(*s*) from the zero-cross point, the triac 56 is put in the OFF state, so that the heater current I is cut off and becomes 0 (A).

In the fourth half-wave, the CPU 94 changes the phase of the second FSRD signal, i.e., outputs the FSRD signal for 200 um after t4(*s*) from the zero-cross point. However, the noise is superposed on the waveform of the AC power source 100 and the voltage is 0 V, and therefore, the triac 56 is kept in the OFF state, so that the heater current I does not flow. After the output of the FSRD signal is stopped, the noise superposed on the waveform of the AC power source 100 disappears after tn3(*s*) from the zero-cross point, but the triac 56 is still turned off after tn1(*s*), and therefore, the heater current I does not flow to the subsequent zero-cross point.

From the fifth half-wave to the eighth half-wave, the operations are performed similarly as in the first half-wave to the fourth half-wave. In the embodiment 2, tn1 is 4.5 ms, tn3 is 7.0 ms, t4 is 6.0 ms, and t5 is 7.0 ms. In each of the fourth and eighth half-waves, the noise is superposed on the waveform of the AC power source 100 in a period in which the second FSRD signal is outputted in one half-wave, so that the electric power is not supplied in the period, and therefore, even when the triac 56 is turned on, the heater current I does not flow. On the other hand, in each of the second and sixth half-wave, the FSRD signals in one half-wave are outputted at phases different from the phases in each of the fourth and eighth half-waves, and the FSRD signal is outputted after the phase of the noise superposed on the waveform of the AC power source 100. For this reason, after the noise is superposed on the waveform of the AC power source 100, the triac 56 is turned on and the heater current I flows. When the CPU 94 determines the electric power control pattern from the data from the fixing temperature sensor 59 similarly as in the embodiment 1, the CPU 94 also determines an output method of the FSRD signals and performs the above-described control operation.

Thus, the CPU 94 changes the number of times in which the driving signal is outputted for each plurality of half-waves in the control period. And, in the half-wave in which the driving signals are outputted a plurality of times in total, on the basis of the zero-cross point, the CPU 94 outputs a first control signal for a first time and then outputs a second control signal for the first time at a timing different from t timing of the first control signal. The second control signal is outputted at a different timing for each of the half-waves in which the second control signal is outputted. In each of the odd-numbered half-waves in the control period, on the basis of the zero-cross point, the CPU 94 outputs the control signal only once for the first time. In each of the even-numbered half-waves in the control period, on the basis of the zero-cross point, the CPU 94 outputs the first control signal for the first time and outputs two control signals each for the first time at timings different from each other. In the even-numbered half-waves, control is carried out so that the half-wave in which the CPU 94 outputs the second control signal at a timing of a fourth time (t5) from the zero-cross point and the half-wave in which the CPU 94 outputs a fourth control signal at a timing of a fifth time (t4), different from the fourth time, from the zero-cross point alternately appear. Incidentally, in the even-numbered half-waves, as regards the half-wave in which the second control signal is outputted, the first control signal is outputted from the zero-cross point, and as regards the fourth control signal is outputted, the second control signal is outputted from the zero-cross point.

Incidentally, in the case where the capacitor 111 charges the electric charge in the half-wave of the negative polarity, in the even-numbered half-wave in the control period, the CPU 94 may output the first control signal for the first time on the basis of the zero-cross point. Further, in the odd-numbered half-wave in the control period, on the basis of the zero-cross point, the CPU 94 outputs the first control signal for the first time and outputs the second control signal for the first time at a timing different from the timing of the first control signal. In the odd-numbered half-waves, the CPU 94 may also carry out control so that the half-wave in which the CPU 94 outputs the second control signal at the timing of the fourth time (t5) from the zero-cross point and the half-wave in which the CPU 94 outputs the fourth control signal at the timing of the fifth time (t4) from the zero-cross point alternately appear.

Next, a change in remaining charge amount of the capacitor 111 will be described. As in each of the first, second, fifth and seventh half-waves of FIG. 11, in a period in which the electric power is supplied from the N-pole to the L-pole of the AC power source 100 and in which the FSRD signal is outputted in one half-wave, the remaining charge amount of the capacitor 111 decreases.

On the other hand, in a period other than the above-described period, the electric charges in the capacitor 111 are maintained, so that the remaining charge amount of the capacitor 111 is unchanged. In each of the second, fourth, sixth, and eighth half-waves, in a period in which the FSRD signal is outputted in one half-wave, the remaining charge amount of the capacitor 111 decrease, and in periods other than the period, the electric charges in the capacitor 111 are charged by the above-described operation. For this reason, the remaining charge amount of the capacitor 111 increases.

In the embodiment 3, similarly as in the embodiment 2, the charging resistor 120 is 13 kΩ, and the charging amount of the electric charges in the capacitor 111 per unit time is smaller than the charging amount in the embodiment 1. In each of the first, third, fifth, and seventh half-waves, the FSRD signal is outputted only once in a short period, and a decrease in remaining charge amount of the capacitor 111 is suppressed to a minimum level, so that the remaining charge amount of the capacitor 111 is maintained in entirety of the electric power control period. For this reason, the CPU 94 is capable of continuing the ON/OFF control of the triac 56 by outputting the FSRD signal while maintaining the remaining charge amount of the capacitor 111, and it is also possible to further suppress the heat generation amount of the charging resistor 120.

As described above, the FSRD signal outputted with a necessary minimum time duration is outputted for each one half-wave while being changed in number of output times and being changed in output phase. By this, even in the case where the charging amount per unit time is small, the following operation can be formed while preventing a decrease in electric charge of the capacitor 111 and maintaining a necessary electric charge amount. That is, the influence of turning-off of the triac 56 due to the noise superposed on the waveform of the AC power source 100 is minimized as can as possible, so that the electric power supply to the heater 54 can be made substantially continuously in the electric power control period. Further, the heat generation of the charging resistor 120 can also be reduced.

As described above, in a circuit such that the gate current is supplied to the bidirectional thyristor from the power source provided separately from the AC power source, the bidirectional thyristor can be continuously controlled by a simple means while suppressing an increase in cost and avoiding the influence due to the distortion of the AC power source and the noise.

Embodiment 4

In embodiment 3, a control constitution in which the FSRD signal in a short time was outputted while changing the number of output times and the phase in a predetermined pattern for each half-wave was described. In the embodiment 4, a control constitution in which the phase of the FSRD signal outputted for each one half-wave by the CPU 94 is randomly changed will be described. For each of the half-waves in the control period, the CPU 94 outputs the second control signal at a random timing on the basis of the zero-cross point. The CPU 94 randomly changes the phase of the FSRD outputted by the CPU 94 for each one half-wave. By this, even in the case where the phase of the noise superposed on the waveform of the AC power source 100 temporarily changes, the electric power supply to the heater 54 can be made continuously while preventing superposition of the phase of the noise with the output phase of the FSRD signal to the extent possible. When the electric power control table is determined, the output of the FSRD signal is also determined in the following manner.

In the case where the electric power is supplied in one half-wave, the CPU 94 determines that of two (first and second) FSRD signals to be outputted in one half-wave, the CPU 94 outputs the first FSRD signal in the neighborhood of the zero-cross point and outputs the second FSRD signal at a phase determined using random number from the zero-cross point. In the embodiment 4, an operation in the case where the electric power with the electric power supply level 8/8 (100%) of FIG. 5 is supplied from the AC power source 100 to the heater 54 will be described.

Timing Chart

Figure 12:
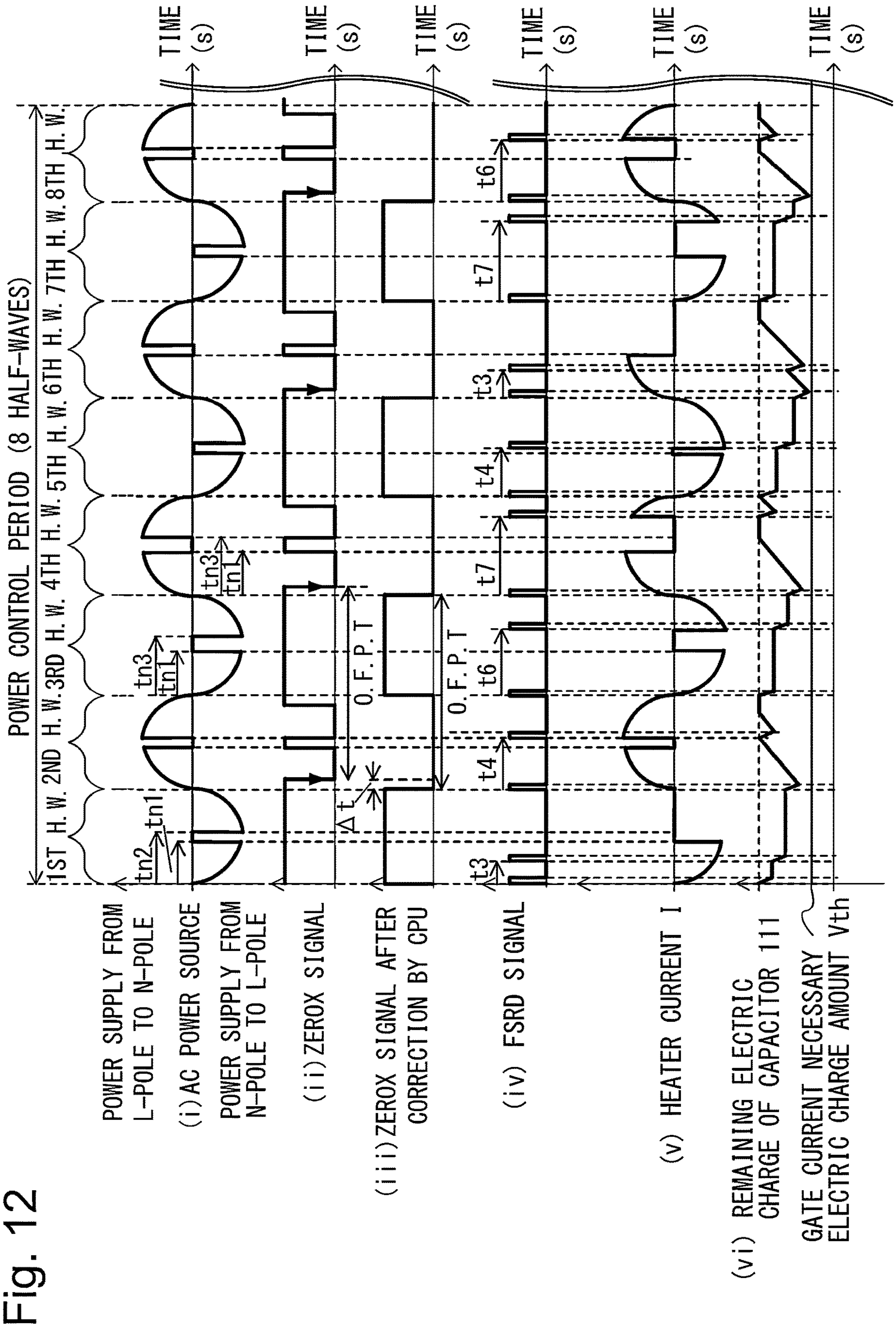
FIG. 12 is a timing chart of electric power control in the embodiment 4.

FIG. 12 is a timing chart showing an operation in the embodiment 4, and parts (i) to (vi) of FIG. 12 are timing charts similar to those in FIGS. 6 and 7. On a waveform of the AC power source 100 of 50 Hz in frequency, the noise is superposed from tn1=4.5 ms to tn3=7.0 ms each from the zero-cross point only in the third half-wave and the fourth half-wave. In the half-waves other than the third half-wave, and the fourth half-wave, similarly as in the embodiment 1, the noise is superposed in a period from tn1=4.5 ms to tn2=5.5 ms each from the zero-cross point. Further, operations until the ZEROX signal after internal correction by CPU is generated are similar to those in the embodiment 1 and will be omitted from similar description.

First, the operations of the FSRD signal and the heater current I will be described. As described above, the CPU 94 determines an output method of the FSRD signals during determination of the electric power control table. On the basis of the determined output method of the FSRD signals, from each of the first half-wave to the eighth half-wave, the CPU 94 outputs the first FSRD signal for 200 us from the neighborhood of the zero-cross point. Further, as regards the second FSRD signal in one half-wave, the CPU 94 outputs the FSRD signals each for 100 μs, for example, after t3(*s*), after t4(*s*), after t6(*s*), after t4(*s*), after t3(*s*), after t7(*s*), and after t6(*s*) each from the zero-cross point in the first half-wave to the eighth half-wave, respectively. In the embodiment 4, t3 is 3.0 ms, t4 is 6.0 ms, t6 is 7.5 ms, and t7 is 8.0 ms.

That is, in each of the first half-wave and the sixth half-wave, the second FSRD signal in one half-wave is outputted earlier than the phase of the noise superposed on the waveform of the AC power source 100. In each of the half-waves other than the first half-wave and the sixth half-wave, the second FSRD signal in one half-wave is outputted later than the phase of the noise superposed on the waveform of the AC power source 100. In each of the first half-wave and the sixth half-wave, when the FSRD signal is outputted in the neighborhood of the zero-cross point, the triac 56 is turned on by the above-described electric power controller 97, so that the heater current I flows. When the noise is superposed on the waveform of the AC power source 100 after tn1=4.5 ms from the zero-cross point, the triac 56 is put in the OFF state, so that the heater current I does not flow to the subsequent zero-cross point. In each of the half-waves other than the first half-wave and the sixth half-wave, when the FSRD signal is outputted in the neighborhood of the zero-cross point, the heater current I flows, and then when the noise is superposed on the waveform of the AC power source 100 after tn1=4.5 ms from the zero-cross point, the triac 56 is similarly put in the OFF state.

In each of the half-waves other than the first half-wave and the sixth half-wave, the AC power source noise disappears after tn2(*s*) or tn3(*s*) from the zero-cross point, and thereafter, the second FSRD signal is outputted in the associated one half-wave. By this, the triac 56 is put in the ON state again, so that the heater current I flows and continuously flows to the subsequent zero-cross point.

Thus, the CPU 94 randomly changes the phase at which the FSRD signal is outputted second in one half-wave, and thus avoids as can as possible that the phase of the noise superposed on the waveform of the AC power source coincides with the phase of the FSRD. By this, in entirety of the one electric power control period, it becomes possible to substantially continuously supply the electric power to the heater 54.

Next, the change in remaining charge amount of the capacitor 111 will be described. In the case where the electric power is supplied from the N-pole to the L-pole of the AC power source 100, the remaining charge amount of the capacitor 111 decreases by the discharge of the electric charges in a period in which the FSRD signal is outputted. On the other hand, in a period in which the FSRD signal is not outputted, the remaining charge amount of the capacitor 111 is maintained to the subsequent zero-cross point without being changed. In the case where the electric power is supplied from the L-pole to the N-pole of the AC power source 100, similarly as in the embodiments 1 to 3, the remaining charge amount of the capacitor 111 decreases in the period in which the FSRD signal is outputted, and in the case where the FSRD signal is not outputted, the capacitor 111 charges the electric charge, so that the remaining charge amount increases. In one half-wave, the FSRD signal is outputted two times and the remaining charge amount of the capacitor 111 decreases, but the output time duration of the FSRD signal is a necessary minimum level. For this reason, the remaining charge amounts of the capacitor 111 when the one electric power control period is started and when the one electric power control period is ended are at least equal to each other. For this reason, the electric power supply control to the heater 54 can be continuously carried out.

As described above, the CPU 94 outputs the FSRD signal while randomly changing the output phase of the FSRD signal. By doing so, tuning-off of the triac 56 due to the noise superposed on the while maintaining a necessary electric charge amount, the influence of turning-off of the triac 56 due to the noise superposed on the waveform of the AC power source 100 is minimized as can as possible, so that the electric power supply to the heater 54 can be made substantially continuously in the electric power control period.

As described above, in a circuit such that the gate current is supplied to the bidirectional thyristor from the power source provided separately from the AC power source, the bidirectional thyristor can be continuously controlled by a simple means while suppressing an increase in cost and avoiding the influence due to the distortion of the AC power source and the noise.

Embodiment 5

In the embodiment 5, a zero-cross circuit capable of detecting the above-described ZEROX signal even in the case where the electric power is supplied from which one of the L-pole and the N-pole of the AC power source 100 is provided. In the embodiment 5, a control constitution in which the above-described FSRD signal is outputted a plurality of times in one half-wave only in the case where the noise of the AC power source 100 generated will be described. Only in a necessary case, the FSRD signal is outputted plural times in one half-wave. By this, in a minimum electric charge use amount of the capacitor 111, the above-described triac 56 is controlled while suppressing the heat generation of the charging resistor 120, so that the electric power supply to the heater 54 is continued by preventing the influence of the noise superposed on the waveform of the AC power source 100 to the extent possible.

Circuit Constitution and Operation

Figure 13:
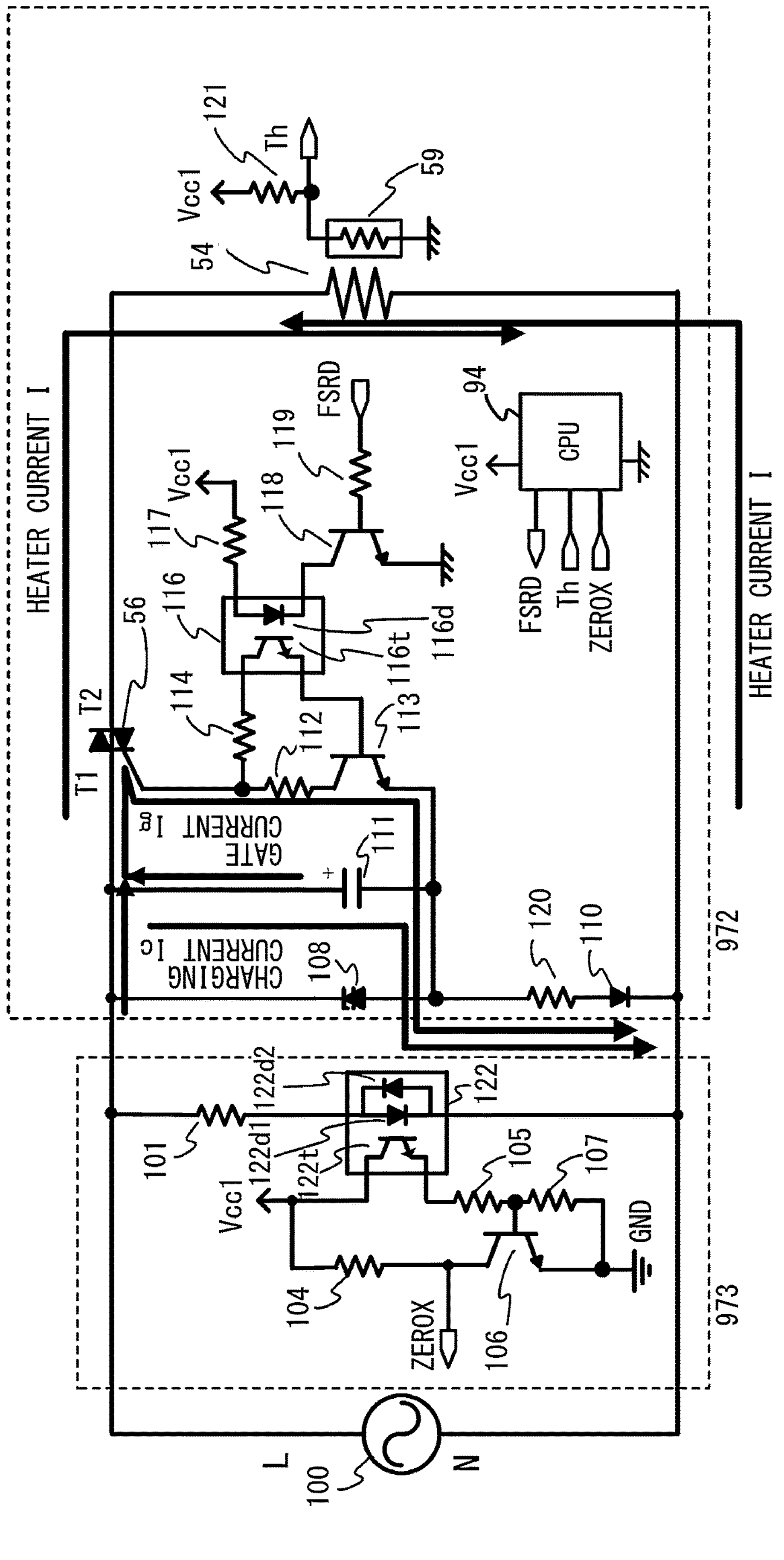
FIG. 13 is a schematic view showing entirety of a circuit constitution of a fixing device of the embodiment 5.

FIG. 13 is a schematic view of entirety of an electric power controller 97 in the embodiment 5. A zero-cross circuit 973 detects half-waves of both the polarities (positive and negative) of the AC voltage. In the zero-cross circuit 973, a photo-coupler 122 operates in both poles from the L-pole to the N-pole and from the N-pole to the L-pole of the AC power source 100. Constituent elements other than the photo-coupler 122 are similar to those in the embodiment 1 and will be omitted from description thereof. The photo-coupler 122 operates similarly as in the embodiments 1 to 4 in the case where the electric power is supplied from the L-pole to the N-pole of the AC power source 100. That is, the current flows through a photo-diode 122*d*1 of the photo-coupler 122, and emits light.

In the case where the electric power is supplied from the N-pole to the L-pole of the AC power source 100, similarly as in the case where the electric power is supplied from the L-pole to the N-pole, the electric power is supplied from the N-pole side, and when the voltage is a certain value or more, the current flows through a photo-diode 122*d*2 of the photo-coupler 122 via the resistor 101 and emits light. When the photo-diode 122*d*2 emits the light, from the DC voltage (source) Vcc1 connected via the resistor, the current flows through between the collector and the emitter of the photo-coupler 122, the resistor 105, and the resistor 107 to the GND via a photo-transistor 122*t* of the photo-coupler 122. Further, at this time, a light-receiving current of the photo-coupler 122 flows toward a base terminal of the transistor 106 via the resistor 105. When the current flows through the base terminal of the transistor 106, the current flows from the DC voltage (source) Vcc1 through the resistor 104 and the collector and the emitter of the transistor 106, so that a potential between the resistor 104 and the collector terminal of the transistor 106 is inputted as the ZEROX signal. Other operations are similar to those in the zero-cross circuit portion 971 described in the embodiment 1.

Timing Chart

Figure 14:
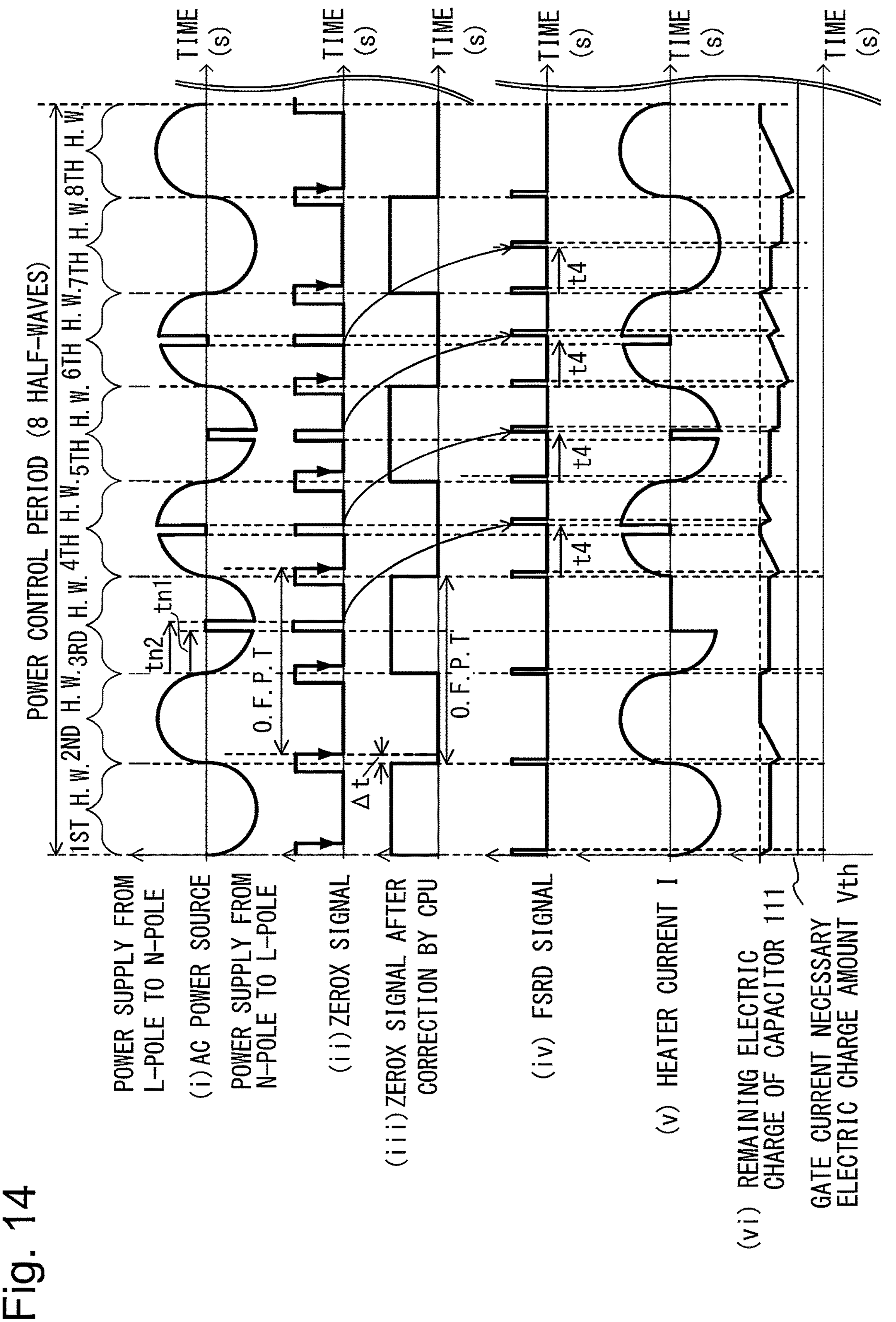
FIG. 14 is a timing chart of electric power control in the embodiment 5.

FIG. 14 is a timing chart showing an operation in the embodiment 5, and parts (i) to (vi) of FIG. 14 are timing charts similar to those in FIGS. 6 and 7. On a waveform of the AC power source 100, the noise is superposed from tn1=4.5 ms to tn2=5.5 ms on the basis of the zero-cross point from the third half-wave to the sixth half-wave, and in the half-waves other than the third to sixth half-waves, there is no noise. As regards the zero-cross signal, in both of the case where the electric power is supplied from the N-pole to the L-pole of the AC power source 100 and the case where the electric power is supplied from the L-pole o the N-pole of the AC power source 100, when the voltage supplied from the AC power source 100 becomes a voltage value which is a certain value or more, the signal changes from the high level to the low level. Other operations until the ZEROX signal after internal correction by CPU is generated are similar to those in the embodiment 1 and will be omitted from similar description.

First, the operations of the FSRD signal and the heater current I will be described. In the first and second half-waves, there is no noise superposed on the waveform of the AC power source 100. The CPU 94 outputs the FSRD signal for 200 μs from the zero-cross point, and when the FSRD signal is outputted, the triac 56 is turned on by the electric power controller 97, so that the heater current I flows to the zero-cross point of the subsequent half-wave.

In from the third half-wave to the sixth half-wave, on the basis of the zero-cross point of the AC power source 100, the noise is superposed in a period from tn1=4.5 ms to tn2=5.5 ms. For this reason, the FSRD signal is outputted for 200 μs, so that the triac 56 is turned on and the heater current I flows, but then the triac 56 is turned and kept off by the superposed noise after tn1(*s*) from the zero-cross point, so that the heater current I does not flow to the subsequent zero-cross point.

Further, from the third half-wave to the sixth half-wave, due to the noise superposed on the waveform of the AC power source 100, the CPU 94 detects the ZEROX signal at a timing other than a predetermined half (cyclic) period T/2. When the CPU 94 detects the ZEROX signal at the timing other than the predetermined half period T/2, the CPU 94 changes the number of times of the output of the FSRD signal from once to twice in a subsequent half-wave. For example, in the third half-wave, the CPU 94 detects the ZEROX signal at the timing of the predetermined half period T/2, and therefore, in the subsequent fourth half-wave, the CPU 94 outputs the FSRD signal two times (arrows from part (ii) to part (iv) of FIG. 14). This is also true for the fourth to sixth half-waves.

From the fourth half-wave to the 7 half-wave, in the last half-wave, the CPU 94 detects the ZEROX signal at the timing of the predetermined half period T/2, and therefore, the CPU 94 outputs the first FSRD signal for 200 μs in the neighborhood of the zero-cross point and then outputs the second FSRD signal for 200 μs after t4(*s*) from the zero-cross point. In this embodiment, t4 is 6.0 ms similarly as in the embodiment 2.

From the fourth half-wave to the sixth half-wave, due to the noise superposed on the waveform of the AC power source 100, the triac 56 is turned off and the flow of the heater current I is stopped. When the CPU 94 outputs the second FSRD signal after t4(*s*) from the zero-cross point, the triac 56 is turned on again, so that the heater current I flows.

In the seventh half-wave, the CPU 94 outputs the FSRD signal two times, but the noise is not superposed on the waveform of the AC power source 100. For this reason, when the heater current I is caused to start to flow by turning on the triac 56 through the output of the first FSRD signal, the heater current I continuously flow to the subsequent zero-cross point. In the eighth half-wave, the CPU 94 did not detect the ZEROX signal in a period other than the half period T/2 in the seventh half-wave which is the last half-wave, and therefore, the CPU 94 outputs the FSRD signal only once for 200 us from the zero-cross point. When the FSRD signal is outputted and the triac 56 is turned on, the heater current I starts to flow and then continuously flows to the subsequent zero-cross point.

The CPU 94 in the embodiment 5 determines whether or not the CPU 94 outputs a first control signal for the first time on the basis of the zero-cross point and then outputs a second control signal for the first time at a timing different from the timing of the first control signal on the basis of the zero-cross point based on a detection result of the zero-cross circuit portion 973. In the case where the zero-cross point is detected by the electric charge circuit portion 973 at a timing different from a half period of the AC voltage in the predetermined half-wave, the CPU 94 outputs a plurality of control signals in a half-wave subsequent to the predetermined half-wave.

Thus, in the case where in the first half-wave, one zero-cross point is detected by the zero-cross circuit portion 973, one control signal is outputted in the second half-wave after the first half-wave. In the case where in the first half-wave, a plurality of zero-cross points are detected by the zero-cross circuit portion 973, a plurality of control signals are outputted in the second half-wave. Specifically, when the CPU 94 detects the ZEROX signal at a timing other than the predetermined half period T/2, the CPU 94 changes the number of output times of the FSRD signal in the subsequent half-wave. Specifically, the CPU 94 increases the number of output times of the FSRD signal in the subsequent half-wave.

As described above, in a circuit such that the gate current is supplied to the bidirectional thyristor from the power source provided separately from the AC power source, the bidirectional thyristor can be continuously controlled by a simple means while suppressing an increase in cost and avoiding the influence due to the distortion of the AC power source and the noise.

According to the present invention, in the circuit such that the gate current is supplied to the bidirectional thyristor from the power source provided separately from the AC power source, it is possible to continuously control the bidirectional thyristor by the simple means while suppressing the increase in cost and avoiding the influence due to the distortion of the AC power source and the noise.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029268 filed on Feb. 28, 2022, which is hereby incorporated by reference herein in its entirety.

What is claimed is:

1. A power control device comprising:

a heater configured to generate heat by being supplied with an AC voltage;

a zero-cross detecting unit configured to detect a zero-cross point of the AC voltage;

a triac configured to switch a conduction state in which the AC voltage is supplied to the heater and a non-conduction in which supply of the AC voltage to the heater is cut off;

a supplying unit configured to supply a current to the triac; and a controlling unit configured to control a state of the triac by outputting a control signal, wherein the controlling unit controls the state of the triac by outputting the control signal in a control period in which a plurality of half waves of the AC voltage with a first polarity and a plurality of half waves of the AC voltage with a second polarity different from the first polarity constitute one period of control, wherein the supplying unit discharges an electric charge when the control signal is outputted in the half wave of each of the first polarity and the second polarity and charges the electric charge when the control signal is not outputted in the half wave of the first polarity, wherein the controlling unit outputs:

in a first half wave, a first control signal on the basis of the zero-cross point as a reference and a second control signal after a delay time $\Delta t_1$, and in a second half wave, a third control signal on the basis of the zero-cross point as a reference and a fourth control signal after a delay time $\Delta t_2$, where $\Delta t_1 \neq \Delta t_2$.

2. A power control device according to claim 1, wherein the controlling unit outputs the second control signal in the half wave of the second polarity in the control period and outputs the fourth control signal in the half wave of the first polarity in the control period.

3. A power control device according to claim 1, wherein the controlling unit outputs the second control signal or the fourth control signal at a random timing on the basis of the zero-cross point as a reference for each of the half waves in the control period.

4. A power control device comprising:

a heater configured to generate heat by being supplied with an AC voltage;

a zero-cross detecting unit configured to detect a zero-cross point of the AC voltage;

a triac configured to switch a conduction state in which the AC voltage is supplied to the heater and a non-conduction in which supply of the AC voltage to the heater is cut off;

a supplying unit configured to supply a current to the triac; and a controlling unit configured to control a state of the triac by outputting a control signal, wherein the controlling unit controls the state of the triac by outputting the control signal in a control period in which a plurality of half waves of the AC voltage with a first polarity and a plurality of half waves of the AC voltage with a second polarity different from the first polarity constitute one period of control, wherein the supplying unit discharges an electric charge when the control signal is outputted in the half wave of each of the first polarity and the second polarity and charges the electric charge when the control signal is not outputted in the half wave of the first polarity, wherein the controlling unit changes a number of outputs of the control signal outputted in the plurality of the half waves by every control period, and wherein the controlling unit outputs:

in a first half wave, a first control signal on the basis of the zero-cross point as a reference and a second control signal after a delay time At1, and in a second half wave, a third control signal on the basis of the zero-cross point as a reference and a fourth control signal after a delay time $\Delta t_2$, where $\Delta t_1 \approx \Delta t_2$.

5. A power control device according to claim 4, wherein the controlling unit outputs the control signal a first number of times in a first half wave and outputs the control signal a second number of times in a second half wave, and wherein the first number of times and the second number of times are different from each other.

6. A power control device comprising:

a heater configured to generate heat by being supplied with an AC voltage;

a zero-cross detecting unit configured to detect a zero-cross point of the AC voltage;

a triac configured to switch a conduction state in which the AC voltage is supplied to the heater and a non-conduction in which supply of the AC voltage to the heater is cut off;

a supplying unit configured to supply a current to the triac; and a controlling unit configured to control a state of the triac by outputting a control signal, wherein the controlling unit controls the state of the triac by outputting the control signal in a control period in which a plurality of half waves of the AC voltage with a first polarity and a plurality of half waves of the AC voltage with a second polarity different from the first polarity constitute one period of control, wherein the supplying unit discharges an electric charge when the control signal is outputted in the half wave of each of the first polarity and the second polarity and charges the electric charge when the control signal is not outputted in the half wave of the first polarity, wherein the controlling unit outputs the control signal a first number of times in a first half wave and outputs the control signal a second number of times in a second half wave, wherein the half wave, in which the controlling unit outputs the control signal a plurality of times includes the half wave in which the controlling unit outputs a first control signal on the basis of the zero-cross point as a reference and a second control signal after a delay time $\Delta t_1$, and includes the half wave in which the controlling unit outputs a third control signal on the basis of the zero-cross point as a reference and a fourth control signal after a delay time $\Delta t_2$, where $\Delta t_1/\Delta t_2$, and wherein the first number of times and the second number of times are different from each other, and the first phase and the second phase are different from each other.

7. A power control device according to claim 6, wherein the controlling unit outputs the control signal the first number of times in the half wave of the second polarity in the control period and outputs the control signal the second number of times in the half wave of the first polarity in the control period, and wherein the controlling unit carries out control so that in the half waves of the first polarity, the half wave in which the controlling unit outputs the second control signal and the half wave in which the controlling unit outputs the fourth control signal are alternately generated.

8. A power control device according to claim 1, wherein the zero-cross detecting unit detects the half wave of the AC voltage with one of the first and second polarities.

9. A power control device according to claim 1, wherein the controlling unit updates an output method of the control signal in a predetermined half wave by every control period.

10. A fixing device for fixing an unfixed toner image on a recording material, comprising:

control device according to claim 1;

a film heated by the heater; and a pressing roller forming a nip in cooperation with the film, wherein the heater is provided in an inside space of the film and nips the film by itself and the pressing roller, and wherein the toner image on the recording material is heated through the film.

11. An image forming apparatus comprising:

an image forming unit configured to form a toner image on a recording material; and device according to claim 10.

* * * * *